(12) United States Patent
Asao et al.

(10) Patent No.: US 6,507,137 B2
(45) Date of Patent: Jan. 14, 2003

(54) VEHICULAR AC GENERATOR

(75) Inventors: Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 42 days.

(21) Appl. No.: 09/879,131

(22) Filed: Jun. 13, 2001

(65) Prior Publication Data

US 2002/0047450 A1 Apr. 25, 2002

Related U.S. Application Data

(62) Division of application No. 09/561,969, filed on May 1, 2000, now Pat. No. 6,285,105.

(30) Foreign Application Priority Data

Dec. 6, 1999 (JP) .............................. 11-346429

(51) Int. Cl.⁷ .............................. H02K 3/04; H02K 3/50
(52) U.S. Cl. ...................................... 310/208; 310/184
(58) Field of Search ................................. 310/179–184, 310/198, 201, 207, 208, 254; 29/596–598

(56) References Cited

U.S. PATENT DOCUMENTS

| 4,307,311 | A |   | 12/1981 | Grozinger |         |
|-----------|---|---|---------|-----------|---------|
| 5,231,324 | A |   | 7/1993  | Kawamura et al. | |
| 5,343,105 | A | * | 8/1994  | Sakabe et al. | 310/179 |
| 5,343,613 | A |   | 9/1994  | Kintz et al. | |
| 5,691,590 | A |   | 11/1997 | Kawai et al. | |
| 5,714,824 | A | * | 2/1998  | Couture et al. | 310/208 |
| 6,049,154 | A |   | 4/2000  | Asao et al. | |
| 6,124,660 | A |   | 9/2000  | Umeda et al. | |
| 6,137,201 | A |   | 10/2000 | Umeda et al. | |
| 6,396,185 | B1| * | 5/2002  | Asao et al. | 310/180 |

FOREIGN PATENT DOCUMENTS

JP          11-164506         6/1999

* cited by examiner

*Primary Examiner*—Tran Nguyen
(74) *Attorney, Agent, or Firm*—Sughrue Mion, PLLC

(57) ABSTRACT

A vehicular AC generator has a stator coil formed by connection of four-turn phase coils by serially inserting coil conductors into slots separated by intervals of three slots, the coil conductors being arranged four in a line in a radial direction. This minimizes the crossover connection portions of the turns, to attendantly prevent a deterioration of the cooling capacity.

4 Claims, 13 Drawing Sheets

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE
⊗ : DIRECTION FROM REAR SIDE TO FRONT SIDE

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE
⊗ : DIRECTION FROM REAR SIDE TO FRONT SIDE

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

SOLID LINES : WIRES AT NON-CONNECTION SIDE (REAR SIDE)
DOTTED LINES : WIRES AT CONNECTION SIDE (FRONT SIDE)

⊙ : DIRECTION FROM FRONT SIDE TO REAR SIDE

⊗ : DIRECTION FROM REAR SIDE TO FRONT SIDE

VEHICULAR AC GENERATOR

This is a divisional of application Ser. No. 09/561,969 filed May 1, 2000, now U.S. Pat. No. 6,285,105 the disclosure of which is incorporated herein by reference.

BACKGROUND OF THE INVENTION

1. Field of the Invention

This invention relates to a vehicular AC generator adapted to prevent cooling ability from being deteriorated by crossover connection portions of each of turns of phase windings of a stator coil. More particularly, this invention relates to a coil winding structure for decreasing or omitting crossover connection portions of each of turns of phase windings of a stator coil.

2. Description of the Related Art

FIG. 8 is sectional diagram showing the configuration of a conventional vehicular AC generator.

The conventional vehicular AC generator is configured so that a Lundell-type rotor 7 is rotatably mounted within a case 3 consisting of an aluminum front bracket 1 and an aluminum rear bracket 2 by means of a shaft 6, and that a stator 8 is fixed to the inner wall of the case 3 in such a manner as to cover the outer periphery of the rotor 7.

The shaft 6 is rotatably supported by the front bracket 1 and the rear bracket 2. A pulley 4 is fixed to one end of this shaft 6, so that the rotating torque of an engine can be transmitted to the shaft 6 by means of a belt (not shown).

Slip rings 9 for supplying electric current to the rotor 7 are fixed to the other end of the shaft 6. A pair of brushes 10 are accommodated in a brush holder 11, which is disposed in the case 3, in such a way as to slide in contact with the slip rings 9. A regulator 19 for regulating the output voltage of the stator 8 is attached to a heat sink 17 fitted on the brush holder 11. A rectifier 12 electrically connected to the stator 8 and adapted to rectify an alternating current generated in the coil the stator 8 to a direct current is mounted within the case 3.

The rotor 7 comprises a rotor coil 13 which generates magnetic flux when an electric current flows therein, and a pair of pole cores 20 and 21 disposed so as to cover the rotor coil 13 in which magnetic poles are formed by the magnetic flux generated by the rotor coil 13. The pole cores 20 and 21 are made of iron, each has a plurality of claw-like magnetic pole pieces 22 and 23 circumferentially provided along the outer circumferential edge thereof at an equiangular pitch in such a way as to protrude therefrom. The pole cores 20 and 21 are fixed to the shaft 6 in such a manner as to face each other so that the magnetic pole pieces 22 and 23 engage with each other. Moreover, fans 5 are fixed to both axial ends of the rotor 7.

The stator 8 comprises a stator core 15 and a stator coil 16 composed of wires wound around this stator core 15 in which an alternating current is generated by alternating the magnetic flux of the rotor 7 owing to the rotation of the rotor 7.

In the conventional AC generator configured in this manner, an electric current is supplied from a battery (not shown) to the rotor coil 13 by means of the brushes 10 and the slip rings 9, so that the magnetic flux is generated. The claw-like magnetic poles 22 of the pole core 20 are magnetized to N polarities by this magnetic flux. The claw-like magnetic poles 23 of the pole core 21 are magnetized to S polarities by this magnetic flux. On the other hand, the rotatinal torque of the engine is transmitted to the shaft 6 by means of the belt and the pulley 4, so that the rotor 7 is rotated. Thus, a rotating magnetic field is given to the stator coil 16. Then, an electromotive force is generated in the stator coil 16. This AC electromotive force is transmitted to and rectified by the rectifier 12 to a direct current, its voltage is regulated by the regulator 18. Then, the battery is recharged.

The rotor coil 13, the stator coil 16, the rectifier 12 and the regulator 18 emit heat at all times during power generation. The heating values of these elements are 60W, 50W, 120W and 6W, respectively, at a high-temperature rotation point in the case of an AC generator of the class that has a rated output current of 100 A.

Thus, intake openings 1a and 2a and exhaust openings 1b and 2b are provided in the front bracket 1 and the rear bracket 2 so as to cool heat generated by power generation. As indicated by arrows in FIG. 8, at the rear side of the generator, outside air is sucked by the rotation of the fans 5 from the intake openings 2a respectively provided in such a way as to face a heat sink 19 of the rectifier 12 and the heat sink 17 of the regulator 18 and flows along the axis of the shaft 6. Consequently, the air cools the rectifier 12 and the regulator 18. Thereafter, each of the flows of the air is turned by the corresponding fan 5 to a centrifugal direction. Thus, the air cools the rear-side coil end of the stator coil 16. Then, the air is discharged to the outside through the exhaust openings 2b. On the other hand, at the front side of the generator, outside air is sucked by the rotation of the fans 5 from the intake openings 1a in the axial direction. Thereafter, each of the flows of the air is turned by the corresponding fan 5 to a centrifugal direction. Thus, the air cools the front-side coil end of the stator coil 16. Then, the air is discharged to the outside through the exhaust openings 1b.

Next, the structure of the conventional stator 8 will be concretely described hereinbelow with reference to FIGS. 9 to 13. FIG. 9 is a rear elevation illustrating the coil connection employed in the conventional stator. FIG. 10 is a perspective view of a primary part of the conventional stator, viewed from the rear side thereof. FIG. 11 is a perspective view of the primary part of the conventional stator, viewed from the front side thereof. FIGS. 12 and 13 are schematic diagrams illustrating a method of winding the conventional stator coils.

The stator core 15 is formed like a cylinder and has a plurality of teeth 15a (each having a rectangular section) provided along the circumference thereof at an equiangular pitch in such a manner as to inwardly radially project therefrom. A slot 15b for accommodating the coil therein is formed between each pair of adjacent teeth 15a. Each of the slots 15b extends in parallel with the axial direction and is opened to the inner circumference of the stator core 15. In the case of this conventional generator, the rotor 7 has 12 magnetic pole pieces, and the stator 8 has 36 slots 15b. Thus, the number of slots per magnetic pole and per phase is 1.

Each of the stator coils 16 is constituted by (nearly U-shaped) coil pieces 30 as follows. Each of the coil pieces 30 has a pair of leg portions 30a connected by a nearly V-shaped connecting portion 30b. The leg portions 30a of each of the coil pieces 30 are inserted into two slots 15b, whose slot numbers are different from each other by three, from the rear side of the stator core 15. Then, open-end portions 30c extending toward the front side of the stator core 15 are joined together. Thus, the stator coils 16 are constructed. Incidentally, a coil conductor is constructed by connecting and integrating the coil pieces 30.

Two coil pieces 30 are inserted into each set of the two slots 15b, whose slot numbers are by 3, from the rear side of the stator core 15, as shown in FIG. 12. At that time, 4 leg portions 30a are accommodated in each of the slots 15b in such a manner as to be radially arranged in a line, as illustrated in FIG. 9. Further, the leg portions 30a of the outer-circumference-side coil piece 30 are inserted into a first place, which is closest to the outer circumference, in one of the slots 15b, whose slot numbers differ from each other by 3, and into the second place closest to the outer circumference, in the other slot 15b. On the other hand, the leg portions 30a of the inner-circumference-side coil piece 30 are inserted into a third place, which is the third closest place to the outer circumference, in one of the slots 15b, whose slot numbers differ from each other by 3, and into a fourth place, which is the fourth closest place to the outer circumference, in the other slot 15b.

Moreover, after the leg portions 30a of each of the coil pieces 30 are inserted into the slots 15b as shown in FIG. 12, the open-end portions thereof extending toward the front side of the stator core 15 are bent in such a way as to outwardly open (that is, bent outwardly circumferentially). Furthermore, the open-end portion 30c of the coil piece 30 extending to the front side of the stator core 15 from the second outmost place in the corresponding slot 15b is made to overlap with the open-end portion 30c of another coil piece 30 extending to the front side from the first outmost place in another slot 15b, whose slot number differs from that of the former slot 15b by 3, as illustrated in FIGS. 11 and 13. Then, these open-end portions 30c are crimped with a clip 29. Subsequently, these open-end portions 30c are soldered to each other. Thus, two outer-circumference-side coils, each of which consists of the connected six outer-circumference-side coil pieces 30, are produced. Similarly, the open-end portion 30c of the coil piece 30 extending to the front side of the stator core 15 from the fourth outmost place in the corresponding slot 15b is made to overlap with the open-end portion 30c of another coil piece 30 extending to the front side from the third outmost place in another slot 15b, whose slot number differs from that of the former slot 15b by 3, as illustrated in FIGS. 11 and 13. Then, these open-end portions 30c are crimped with a clip 29. Subsequently, these open-end portions 30c are soldered to each other. Consequently, two inner-circumference-side coils, each of which consists of the connected six inner-circumference-side coil pieces 30, are produced.

Thus, in the two outer-circumference-side coils and the two inner-circumference-side coils inserted into adjacent two sets of two slots 15b selected at intervals of three slots, these coils are cut at the adjoining rear-side coil-end portions of these coils, as illustrated in FIG. 9. Subsequently, an end portion u1' of one of the inner-circumference-side coils is joined with an end portion u2 of one of the outer-circumference-side coils. Moreover, another end portion u2' of this outer-circumference-side coil is joined with an end portion u3 of the other inner-circumference-side coil. Furthermore, another end portion u3' of this inner-circumference-side coil is joined with an end portion u4 of the other outer-circumference-side coil. Thus, a four-turn coil corresponding to one phase is obtained. Further, the end portion u1 of the former inner-circumference-side coil is connected to the rectifier 12 as a lead wire. Moreover, the end portion u4' of the latter outer-circumference-side coil is connected to a neutral point in a star three-phase connection among this coil and coils respectively corresponding to other two phases.

Furthermore, similarly, the coils respectively corresponding to other two phases are produced.

Further, each of the u1'-u2 connection portion, the u2'-u3 connection portion and the u3'-u4 connection portion is not constituted by the connecting portion of the coil piece. Instead, these connection portions are formed outside the coil end portions, as crossover connection portions, as illustrated in FIG. 10. Incidentally, although three crossover connection portions are shown in FIG. 10, the stator actually has coils respectively corresponding to three phases. Thus, the stator has nine crossover connection portions.

In the case of the stator 8 constructed in this manner, the coil pieces 30 are inserted into the slots 15b from the rear side thereof. Moreover, the open-end portions 30c extending to the front side thereof are connected to each other as described above. Thus, the coil pieces 30 have almost the same shape. This results in increase in productivity of stators and easiness in being shaped after the fabrication thereof. Consequently, this reduces time and effort to perform the step of shaping the coil after the coil pieces are inserted into slots and connected to each other.

Moreover, connection portions for connecting the open-end portions 30c of the coil pieces 30 are concentrated at the front side of the stator. This enhances the workability in a process of connecting the open-end portions.

Incidentally, each of the nearly U-shaped coil pieces 30 is folded back nearly at the center of the corresponding connecting portion 30b. Both leg portions 30a of each of the coil pieces 30 are deviated from the folded-back portion in such a way as to suitably be accommodated in the slots 15b. Thus, each of the coil pieces 30 is inserted at a predetermined angle with respect to the circumference of the stator 8. Further, the longitudinal direction of each of the coil pieces 30 is a radial direction of the stator 8 at the folded-back portion thereof. In the slots 15b, one of the leg portions 30a is placed along a radius extending from the center of the stator core 15, while the other leg portion 30a is placed along a different radius of the stator core 15.

In this case of the stator 8 constructed in this manner, three crossover connection portions are necessary for connecting between 4-turn coils constituting each phase coil. Consequently, the conventional vehicular AC generator has a problem in that it is necessary for forming the crossover connection portions to cut, bend and draw the coil pieces 30 excessively and that thus, the workability thereof is deteriorated.

Thus, an improved stator structure for reducing the number of the crossover connection portions between 4-turn coils constituting each phase coil has been proposed.

FIG. 14 is a rear elevation illustrating the coil connection of an improved stator applied to a conventional vehicular AC generator. FIG. 15 is a perspective view of a primary part of the improved stator applied to the conventional vehicular AC generator viewed from the rear side thereof.

As shown in FIGS. 14 and 15, two coil pieces 30 are inserted from the rear side of the stator core 15 into each of the slots 15b whose slot numbers differ by three from each other. At that time, four leg portions 30a are axially arranged in a line and accommodated in each of the slots 15b. Further, two leg portions 30a of each of the coil pieces 30 are sequentially inserted into the second outermost place in a slot 15b and the third outermost place in another slot 15b, which is the third slot from the former slot 15b in the clockwise circumferential direction in FIG. 14. Moreover, two leg portions 30a of another coil piece 30 are serially inserted into the first outermost place in a slot 15b and into the fourth outermost place in another slot 15b, which is the third slot from the former slot 15b in the clockwise circumferential direction in FIG. 14, in such a manner as to stride over the connecting portion 30c of the coil piece 30 having leg portions precedingly inserted into the second outermost place in a slot 15b and into the third outermost place in another slot 15b, which is the third slot from the former slot 15b. Thus, the rear-side coil end portion is configured by stacking the connecting portions 30c of the coil pieces 30 as two layers as shown in FIG. 15.

Subsequently, in the case of each coil piece 30 having leg portions respectively inserted into the second outermost place in a slot 15b and into the third outermost place in another slot 15b, the open-end portions thereof extending from the slot 15b toward the front side of the stator core 15 are bent in such a way as to outwardly open, that is, bent outwardly. Furthermore, in the case of each coil piece 30 having leg portions respectively inserted into the first outermost place in a slot 15b and into the fourth outermost place in another slot 15b, the open-end portions thereof extending from the slot 15b toward the front side of the stator core 15 are bent inwardly.

Furthermore, the open-end portion 30c of the coil piece 30 extending to the front side of the stator core 15 from the second outmost place in the corresponding slot 15b, as indicated by dotted lines in FIG. 14, is made to overlap with the open-end portion 30c of another coil piece 30 extending to the front side from the first outmost place in another slot 15b, whose slot number differs from that of the former slot 15b by 3 in the counterclockwise circumferentially, as illustrated in FIG. 14. Then, these open-end portions 30c are crimped with a clip. Subsequently, these open-end portions 30c are soldered to each other. Similarly, the open-end portion 30c of the coil piece 30 extending to the front side of the stator core 15 from the third outmost place in the corresponding slot 15b, as indicated by dotted lines in FIG. 14, is made to overlap with the open-end portion 30c of another coil piece 30 extending to the front side from the fourth outmost place in another slot 15b, whose slot number differs from that of the former slot 15b by 3 in the clockwise circumferentially, as illustrated in FIG. 14. Then, these open-end portions 30c are crimped with a clip. Subsequently, these open-end portions 30c are soldered to each other.

Subsequently, the connecting portion 30b (thus, the rear-side coil end portions) is cut off from the coil piece 30 having leg portions respectively inserted into the second outermost place in one slot of the one set of the slots 15b, whose slot number differs from each other by three, and into the third outermost place in another slot 15b. Furthermore, the connecting portion 30b (thus, the rear-side coil end portions) is cut off from the coil piece 30 having leg portions respectively inserted into the first outermost place in one slot of the one set of the slots 15b, whose slot number differs from each other by three, and into the fourth outermost place in another slot 15b.

Then, end portions u2' cut off from the coil peace 30 is connected to end portion u3 of cut off from the coil peace 30. Thus, first and second coils each which consists of twelve connected coil pieces 30 are connected at this u2'-u3 connection portion. Consequently, a four-turn coil constituted by connecting 24 coil pieces 30 is obtained.

Further, end portions u1 and u4' of the coil pieces 30, which are cut off therefrom, respectively extend from the second and fourth places in the slots 15b to the rear side of the stator core 15, as illustrated in FIG. 15. The end portion u1 acts as a lead wire, and the end portion u4' is connected to a neutral point.

Furthermore, coils corresponding to other two phases are similarly produced. Further, the end portion u1 of the cut coil piece 30 is connected to the rectifier 12 as a lead wire. Moreover, the end portion u4' of the coil piece 30 is connected to a neutral point in a star three-phase connection among this coil and coils respectively corresponding to other two phases. Thus, a stator 8A is obtained.

Incidentally, although one u2'-u3 connection portion served for crossover connection portion is shown in FIG. 15, the stator has coils respectively corresponding to three phases. Thus, the stator has three crossover connection portions.

In the improved stator coil 16A constructed in this manner, the number of the crossover connection portions is reduced to three.

Thus, the work load of cutting, bending and drawing the coil pieces 30 so as to form the crossover connection portion is alleviated. Consequently, the workability thereof is considerably enhanced.

In this conventional vehicular AC generator, each of constituent phase coils of the stator coils 16 of the stator 8 is constituted by a four-turn coil. The crossover connection portion of each turn is provided at the side opposite to the part connecting the open-end portions 30c. Moreover, the crossover connection portion of each turn protrudes outwardly axially from the coil end portion.

Although the height of the coil end portion at the side of the connecting portion 30b of each of the coil pieces 30 (namely, the dimension of a part projecting from the end surface of the stator core 15) can be reduced, the crossover connection portion of each turn outwardly axially protrudes from the aligned coil end portions, so that the wind resistance at the discharge side of each of the fans increases. Consequently, the total air quantity of the fans decreases, and the cooling ability of the generator is degraded. Especially, when the axial height of the rear-side coil end portion is large, the ability to cool rear-side internal fittings, such as the rectifier 12 and the regulator 18, is adversely affected.

Furthermore, unaligned large coil end portions are placed at the discharge side of the fans. Thus, the conventional vehicular AC generator has a problem in that higher-order discomfort interference noises are generated between the coil end portion and the fan 5 or the coil end portion and the shoulder of each of the claw-like magnetic pole piece 23 of the pole core 21 and that thus, wind noises are loud.

Moreover, the conventional vehicular AC generator has another problem in that it is necessary for connecting 4-turn coils to cut, bend and draw the coil pieces 30 and that thus, the workability thereof is extremely deteriorated.

Additionally, the conventional vehicular AC generator has another problem in that, owing to vibrations thereof, a break is liable to occur in the crossover connection portions and that thus, the risk of power-generation failure is increased.

On the other hand, in the stator coil 16A of the improved stator 8A, the number of the crossover connection portion between four-turn coil constituting each of constituent phase coils is reduced to one. Thus, the work load of cutting, bending and drawing the coil pieces 30 so as to form the crossover connection portion is alleviated. Consequently, the workability in winding the stator coil is considerably enhanced. However, in the stator coil 16A, apex portions 30d of the connecting portions 30b of the coil pieces 30 are axially stacked as two layers and are circumferentially arranged, so that the height of the coil end portion is large and the wind resistance at the discharge side of each of the fans increases. Consequently, the total air quantity of the fans decreases, and the cooling ability of the generator is degraded.

Furthermore, the apex portions 30d of the connecting portions 30b are axially stacked as two layers, so that inner connecting portions 30b are covered by outer connecting portions 30b. Thus, in the soldering process of the open-end portions of the coil pieces 30, even if the stator core 15 is chucked and a plane jig is held to the apex portions 30d of the connecting portions 30b, the open-end portions 30c thereof are of unequal height. In this case, even if the length of the leg portions of each coil piece 30 is preliminary adjusted so as to be able to make the open-end portions 30c of uniform height by holding the plane jig to the apex portions 30d of the connecting portions 30b, the open-end portions 30c thereof are of unequal height as the plane jig is not in contact with the apex portions 30d of the inner connecting portions 30b. Consequently, as the inner coil pieces 30 are soldered in such an unstable condition, the workability in soldering between the open-end portions 30c, that is, the workability in winding the stator coil is extremely deteriorated.

SUMMARY OF THE INVENTION

The present invention is accomplished to solve the aforementioned problems of the conventional vehicular AC generator. Accordingly, an object of the present invention is to provide a vehicular AC generator, which enhances the workability in winding the stator coil and prevents deterioration in ability to cool devices and increase in wind noises due to the projection of crossover connection portions from coil end portions by devising a coil winding structure so as to reduce and omit the crossover connection portions of turns of each constituent phase coil and to expose apex portions of connecting portions of coil pieces.

To achieve the foregoing object, according to an aspect of the present invention, there is provided a vehicular AC generator comprising:

a shaft rotatably supported on a pair of brackets;

a rotor fixed to the shaft and disposed in said pair of brackets;

a stator disposed at an outer-circumference-side of said rotor and fixed to said pair of brackets;

internal fittings placed at a rear side of said rotor; and a fan driven by a rotation of said shaft and for forming a flow of cooling air flowing along an axis of said shaft, wherein said stator comprising:

a stator core in which a plurality of slots, whose grooves extend in an axial direction, are circumferentially provided at an equiangular pitch so as to open on an inner circumference side thereof; and a stator coil formed by AC connection of four-turn phase coils constructed by serially inserting coil conductors into said slots separated by a predetermined interval of said slots, said coil conductors being arranged four in a line in a radial direction, and wherein each of said phase coils comprises:

nearly U-shaped first coil pieces, which constitute said coil conductors, inserted from an axial side into two adjacent sets of two of said separated slots, respectively, so that said first coil pieces are respectively positioned at a third outermost place in one slot of each of said two sets and at a second outermost place in the other slot of each of said two sets, and remaining first coil pieces inserted from an axial side into remaining sets of two of said separated slots, respectively, so that one of said remaining first coil pieces is respectively positioned at a first outermost place in one slot of each of said remaining sets and at a second outermost place in the other slot of each of said remaining sets and that another of said remaining first coil pieces is respectively positioned at a third outermost place in said one slot of each of said remaining sets and at a fourth outermost place in the other slot of each of said remaining sets;

second coil pieces, which constitute said coil conductors, inserted into said two sets of two of said separated slots, respectively, so that said second coil pieces are respectively positioned at a first outermost place in said one slot of each of said two sets and at a fourth outermost place of the other slot of each of said two sets and that end portions of said second coil piece extend from each slot of said two sets to both axial sides;

a two-turn first coil formed by connecting an end portion of each of said first coil pieces, which extend from the second outermost place in each of said slots to an axial opposite side and are bent circumferentially outwardly, to a corresponding end portion of said first and second coil pieces, which extend from the first outermost place of said slot, whose slot number differs from that thereof by the predetermined interval of said slots, to the axial opposite side and are bent circumferentially outwardly;

a two-turn second coil formed by connecting an end portion of each of said first and second coil pieces, which extend from the fourth outermost place in said slots to the axial opposite side and are bent circumferentially outwardly, to a corresponding end portion of said first coil pieces, which extends from the third outermost place in said slot, whose slot number differs from that thereof by the predetermined interval of said slots, to the axial opposite side and is bent circumferentially outwardly; and a crossover connection portion between said first and second coils formed by connecting one of first and second sets of end portions of said second coil pieces, said first set of end portions of said second coil piece extending from the first outermost place in said one slot of each of said two sets to the axial side, said second set of end portions of said second coil piece extending from the fourth outermost place in the other slot of each of said two sets to the axial side, the other set of end portions being used as a lead wire and a wire connected to a neutral point formed among said phase coils.

According to another aspect of the present invention, there is provided a vehicular AC generator comprising:

a shaft rotatably supported on a pair of brackets;

a rotor fixed to said shaft and disposed in said pair of brackets;

a stator disposed at an outer-circumference-side of said rotor and fixed to said pair of brackets;

internal fittings placed at a rear side of said rotor; and a fan driven by a rotation of said shaft and for forming a flow of cooling air flowing along an axis of said shaft, wherein said stator comprises:

a stator core in which a plurality of slots, whose grooves extend in an axial direction, are circumferentially provided at an equiangular pitch so as to open on an inner circumference side thereof; and a stator coil formed by AC connection of four-turn phase coils constructed by serially inserting coil conductors into said slots separated by a predetermined interval of said slots, said coil conductors being arranged four in a line in a radial direction, and wherein each of said phase coils comprises:

one of nearly U-shaped first coil pieces, which constitute said coil conductors, inserted from an axial side into one set of two of said separated slots so that said first coil piece is respectively positioned at a first outermost place in one slot of said one set and at a third outermost place in the other slot of said one set, and remaining first coil pieces inserted from an axial side into remaining sets of two of said separated slots, respectively, so that one of said remaining first coil pieces is respectively positioned at a first outermost place in one slot of each of said remaining sets and at a fourth outermost place in the other slot of each of said remaining sets and that another of said remaining first coil pieces is respectively positioned at a second outermost place in said one slot of each of said remaining sets and at a third outermost place in the other slot of each of said remaining sets; and second coil pieces, which constitute said coil conductors, inserted into said one set of two of said separated slots so that said second coil pieces are respectively positioned at a second outermost place in said one slot of said one set and at a fourth outermost place of the other slot of said one set and that end portions of said second coil piece extend from each slot of said one set to both axial sides, wherein one of said remaining first coil pieces, which are respectively inserted from the axial side into the first outermost place in one slot of each of said remaining sets and the fourth outermost place in the other slot of each of said remaining sets, is respectively placed in each gap formed between another of said remaining first coil pieces, which are respectively inserted from the axial side into the second outermost place in said one slot of each of said remaining sets and the third outermost place in the other slot of each of said remaining sets, at said connecting portion thereof by setting heights of apex portion of said connecting portion at an equal value, wherein a four-turn coil is formed by connecting an end portion of each of said first and second coil pieces, which extend from the second outermost place in each of said slots to an axial opposite side and are bent circumferentially outwardly, to a corresponding end portion of said first coil pieces, which extend from the first outermost place of said slot, whose slot number differs from that thereof by the predetermined interval of said slots, to the axial opposite side and are bent circumferentially inwardly and by connecting an end portion of each of said first and second coil pieces, which extend from the fourth outermost place in said slots to the axial opposite side and are bent circumferentially inwardly, is connected to a corresponding end portion of said first coil pieces, which extends from the third outermost place in said slot, whose slot number differs from that thereof by the predetermined interval of said slots, to the axial opposite side and is bent circumferentially outwardly, and wherein an end portion of said second coil piece extending from the second outermost place in said one slot of said one set to the axial side and an end portion of said second coil piece extending from the fourth outermost place in the other slot of said one set to the axial side are used as a lead wire and a wire connected to a neutral point formed among said phase coils.

According to another aspect of the present invention, there is provided a vehicular AC generator comprising:

a shaft rotatably supported on a pair of brackets;

a rotor fixed to said shaft and disposed in said pair of brackets;

a stator disposed at an outer-circumference-side of said rotor and fixed to said pair of brackets;

internal fittings placed at a rear side of said rotor; and a fan driven by a rotation of said shaft and for forming a flow of cooling air flowing along an axis of said shaft, wherein said stator comprises:

a stator core in which a plurality of slots, whose grooves extend in an axial direction, are circumferentially provided at an equiangular pitch so as to open on an inner circumference side thereof; and a stator coil formed by AC connection of four-turn phase coils constructed by serially inserting coil conductors into said slots separated by a predetermined interval of said slots, said coil conductors being arranged four in a line in a radial direction, and wherein each of said phase coils comprises:

one of nearly U-shaped first coil pieces, which constitute said coil conductors, inserted from an axial side into one set of two of said separated slots so that said first coil piece is respectively positioned at a first outermost place in one slot of said one set and at a fourth outermost place in the other slot of said one set, and remaining first coil pieces inserted from an axial side into remaining sets of two of said separated slots, respectively, so that one of said remaining first coil pieces is respectively positioned at a first outermost place in one slot of each of said remaining sets and at a third outermost place in the other slot of each of said remaining sets and that another of said remaining first coil pieces is respectively positioned at a second outermost place in said one slot of each of said remaining sets and at a fourth outermost place in the other slot of each of said remaining sets; and second coil pieces, which constitute said coil conductors, inserted into said one set of two of said separated slots so that said second coil pieces are respectively positioned at a second outermost place in said one slot of said one set and at a third outermost place of the other slot of said one set and that end portions of said second coil piece extend from each slot of said one set to both axial sides, wherein a four-turn coil is formed by connecting an end portion of each of said first and second coil pieces, which extend from the second outermost place in each of said slots to an axial opposite side and are bent circumferentially outwardly, to a corresponding end portion of said first coil pieces, which extend from the first outermost place of said slot, whose slot number differs from that thereof by the predetermined interval of said slots, to the axial opposite side and are bent circumferentially inwardly and by connecting an end portion of each of said first coil pieces, which extend from the fourth outermost place in said slots to the axial opposite side and are bent circumferentially outwardly, to a corresponding end portion of said first and second coil pieces, which extends from the third outermost place in said slot, whose slot number differs from that thereof by the predetermined interval of said slots, to the axial opposite side and is bent circumferentially inwardly;

and wherein end portions of said second coil piece extending from the second outermost place in said one slot of said one set to the axial side and from the third outermost place in the other slot of said one set to the axial side are used as a lead wire and a wire connected to a neutral point formed among said phase coils.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

First Embodiment

Figure 1:
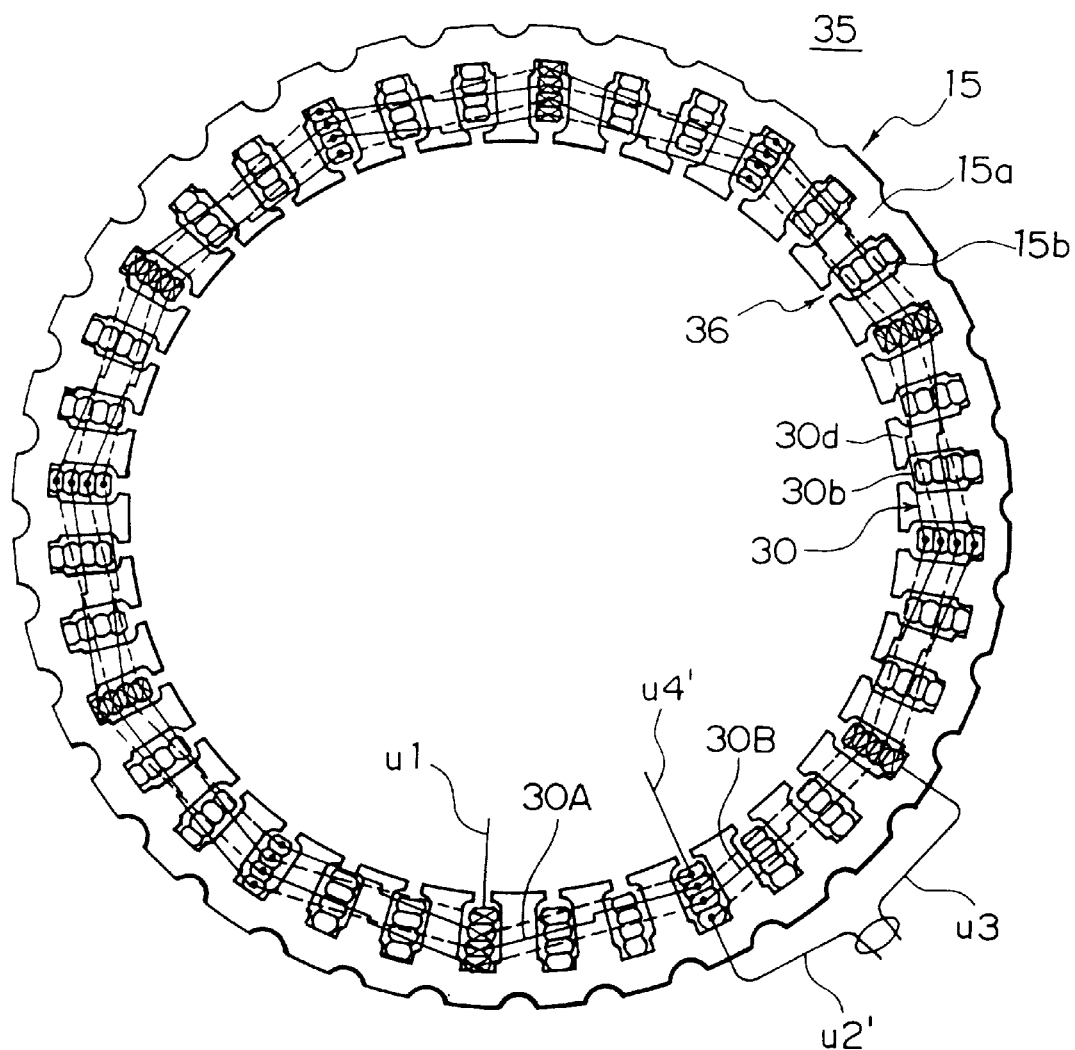
FIG. 1 is a rear elevation illustrating the coil connection of a stator applied to a vehicular AC generator, which is a first embodiment of the present invention.
Figure 2:
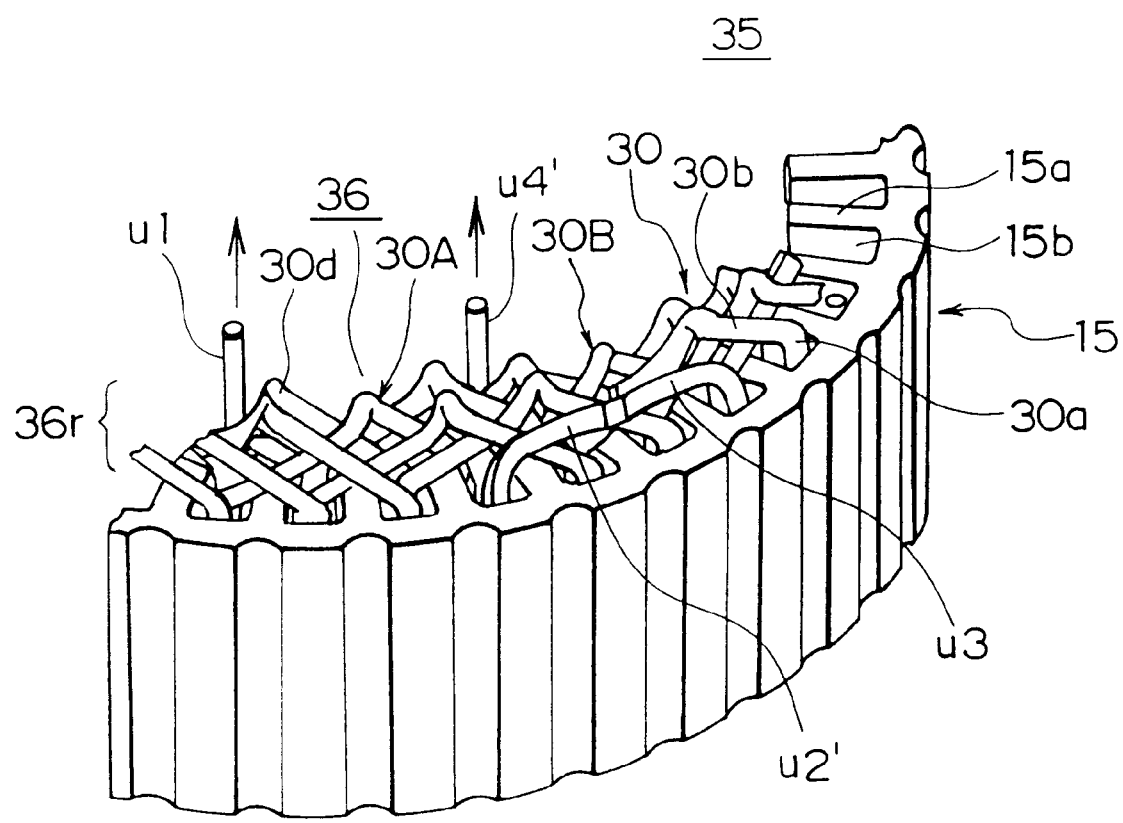
FIG. 2 is a perspective view of a primary part of the stator applied to the vehicular AC generator, which is the first embodiment of the present invention, viewed from the rear side thereof.
Figure 3:
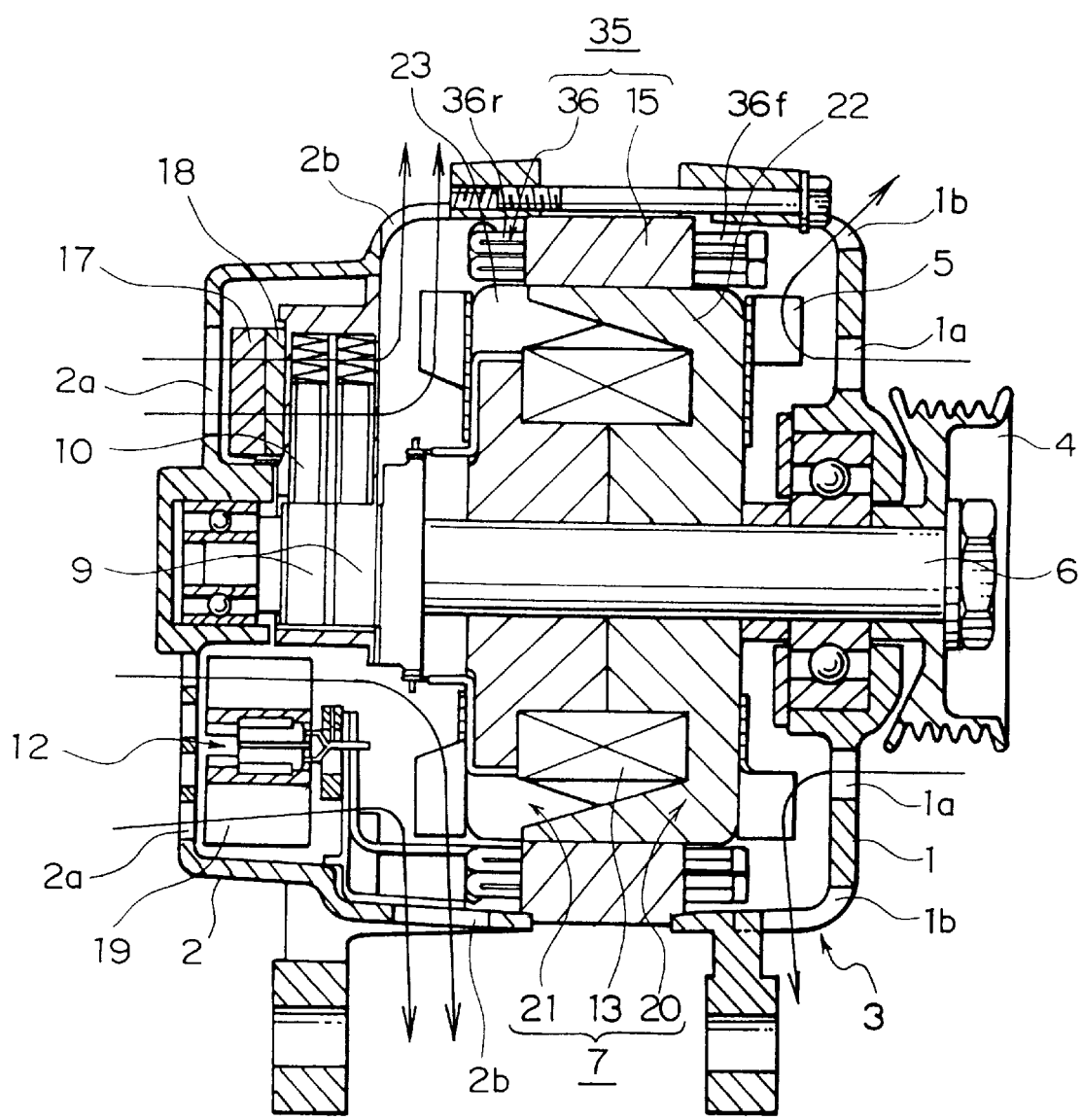
FIG. 3 is a sectional diagram showing the vehicular AC generator, which is the first embodiment of the present invention.

FIG. 1 is a rear elevation illustrating the coil connection of a stator applied to a vehicular AC generator, which is the first embodiment of the present invention. FIG. 2 is a perspective view of a primary part of the stator applied to the vehicular AC generator, which is the first embodiment of the present invention, viewed from the rear side thereof.

A stator 35 of the first embodiment consists of a stator core 15 and a stator coil 36. Similarly as in the case of the conventional stator coil 16, the stator coil 36 is constituted by (nearly U-shaped) coil pieces 30 as follows. Each of the coil pieces 30 has a pair of leg portions 30a connected by a nearly V-shaped connecting portion 30b. The leg portions 30a of each of the coil pieces 30 are inserted into two slots 15b, whose slot numbers are different from each other by three, from the rear side of the stator core 15. Then, open-end portions 30c extending toward the front side of the stator core 15 are joined together. However, the number of crossover connection portions of each phase coil is reduced to 1 by devising a coil wiring method.

Next, the structure of the stator 35 will be described hereinbelow with reference to FIGS. 1 and 2.

Two coil pieces 30 are inserted from the rear side of the stator core 15 into each set of the slots 15b whose slot numbers differ by three from each other. At that time, four leg portions 30a are radially arranged in a line and accommodated in each of the slots 15b. Further, two leg portions 30a of each of the outer-circumference-side coil piece 30 are respectively inserted into the first outermost place in a slot 15b and the second outermost place in another slot 15b, which is the third slot from the former slot 15b in the clockwise circumferential direction in FIG. 1. On the other hand, two leg portions 30a of each of the inner-circumference-side coil piece 30 are respectively inserted into the third outermost place in a slot 15b and the fourth outermost place in another slot 15b, which is the third slot from the former slot 15b in the clockwise circumferential direction in FIG. 1. Thus, a rear-side coil end portion 36r is configured by arranging in the circumferential direction the apex portions (return portion) of the connecting portions 30b of the coil pieces 30 aligned in two rows in the radial direction as shown in FIG. 2.

Incidentally, the slot inserting positions, into which leg portions of a coil piece 30 are inserted, in each of adjacent two sets of the slots 15b, whose slot numbers differ from each other by three, are set to differ from those in other sets of such two slots 15b. Namely, in the former set of two slots 15b, the leg portions of one coil piece 30 are respectively inserted into the first outermost place in one of these two slots 15b from the outer-circumference and into the fourth outermost place in the other slot 15b, whose slot number differs from that of the former slot 15b by three in the clockwise circumference direction in FIG. 1. Moreover, the leg portions of another coil piece 30 are respectively inserted into the third outermost place in one of these two slots 15b and into the second outermost place in the other slot 15b, whose slot number differs from that of the former slot 15b by three in the clockwise circumferential direction in FIG. 1.

Additionally, the former coil piece 30 corresponds to a second coil piece, which has leg portions respectively inserted into the first outermost place in one of these two slots 15b from the outer-circumference and into the fourth outermost place in the other slot 15b, whose slot number differs from that of the former slot 15b by three in the clockwise circumference direction in FIG. 1. The other coil piece 30 corresponds to a first coil piece.

Further, each of the coil pieces 30 is folded back at the apex portion 30d of the connecting portion 30b so that a pair of leg portions 30a thereof are deviated from each other in the radial direction in FIG. 1. Moreover, each of coil pieces 30A and 30B, which has leg portions respectively inserted into the third outermost place in one of two slots 15b and into the second outermost place in the other slot 15b whose slot number differs from that of the former slot 15b by three in the clockwise circumferential direction, is adapted so that the direction, in which the leg portions thereof are folded back at the apex portion 30d of the connecting portion 30b, is opposite to such a direction in the case of other coil pieces 30 so as to suppress the interference from those coil pieces 30.

Consequently, the rear-side coil end portion 36r is configured by arranging in the circumferential direction the apex portions (return portion) of the connecting portions 30b of the coil pieces 30 aligned in two rows in the radial direction as shown in FIGS. 1 and 2.

Furthermore, after the leg portions of each of the coil pieces 30 are inserted into the slots 15b, the open-end sides extending toward the front side are outwardly bent. Further, as indicated by dotted lines in FIG. 1, the open-end portion 30c of the coil piece 30, which extends to the front side from the second outermost place of a slot 15b, is made to overlap with the open-end portion 30c of another coil piece 30 extending to the front side from the first outmost place in another slot 15b, whose slot number differs from that of the former slot 15b by three. Then, these open-end portions 30c are crimped with a clip. Subsequently, these open-end portions 30c are soldered to each other. Thus, two-turn outer-circumference-side coil (namely, a first coil), which consists of twelve connected outer-circumference-side coil pieces 30, are produced. Similarly, the open-end portion 30c of the coil piece 30 extending to the front side of the stator core 15 from the fourth outmost place in the corresponding slot 15b is made to overlap with the open-end portion 30c of another coil piece 30 extending to the front side from the third outmost place in another slot 15b, whose slot number differs from that of the former slot 15b by 3, as indicated by dotted lines in FIG. 1. Then, these open-end portions 30c are crimped with a clip. Subsequently, these open-end portions 30c are soldered to each other. Consequently, two-turn inner-circumference-side coil (namely, a second coil), which consists of twelve connected inner-circumference-side coil pieces 30, are produced.

Then, the connecting portions 30b (thus, the rear-side coil end portions) are cut off from each coil piece 30 having leg portions respectively inserted into the first outermost place in one slot of two sets of the slots 15b and into the fourth outermost place in another slot 15b, whose slot number differs by three from that of the former slot 15b in the clockwise circumferential direction in FIG. 1. Subsequently, end portions u2' and u3 of each coil piece 30, which are cut off and extend from the first outermost place in the slot 15b, are made to overlap with each other and joined together. Thus, a four-turn coil corresponding to a phase is produced. Thus, in a one-phase constituent coil of the stator coil 36, end portions u1 and u4' of each of the cut coil pieces 30 extend from the fourth outermost place in the slot 15b to the rear side of the stator core 15, as shown in FIG. 2.

Moreover, coils corresponding to other two phases are similarly produced. Furthermore, the end portion u1 of the cut coil piece 30 is connected to the rectifier 12 as a lead wire. Moreover, the end portion u4' of another coil piece 30 is connected to a neutral point in a star three-phase connection among this coil and coils respectively corresponding to other two phases.

Further, each of the u1'-u2 connection portion and the u3'-u4 connection portion, which are necessary for the conventional stator coil 16, are replaced with the coil pieces 30A and 30B, each of which has leg portions respectively inserted into the third outermost place in one of the slots 15b and into the second outermost place in another slot 15b, whose slot number differs from that of the former slot 15b by three in the circumferential direction. Thus, only one crossover connection portion u2'-u3 still remains in the stator. Incidentally, because the stator actually has coils respectively corresponding to three phases, the stator has three crossover connection portions.

In this first embodiment, the coil pieces 30 are inserted into the slots 15b from the rear side thereof, similarly as in the conventional generator. Moreover, the open-end portions 30c extending to the front side thereof are connected to each other as described above. Thus, stator coils 36 are produced. Consequently, the coil pieces 30 have almost the same shape. This results in increase in productivity of stators and easiness in being shaped after the fabrication thereof. Consequently, this reduces time and effort to perform the step of shaping the coil after the coil pieces are inserted into slots and connected to each other. Furthermore, connection portions for connecting the open-end portions 30c of the coil pieces 30 are concentrated at the front side of the stator. This enhances the workability in a process of connecting the open-end portions.

According to the first embodiment, the number of the crossover connection portions between 4-turn coils constituting constituent phase coil of the stator coil 36 is reduced to 1. Thus, the work load of cutting, bending and drawing the coil pieces 30 so as to form the crossover connection portion is alleviated. Consequently, the workability thereof is considerably enhanced. Moreover, the risk of a break in the crossover connection portion due to vibrations of the vehicular AC generator is reduced. Consequently, an occurrence of power-generation failure owing to the break in the crossover connection portion is prevented.

Further, the crossover connection portion u2'-u3 is configured by overlapping and connecting the end portions u2' and u3 of each coil piece 30, which extend toward the rear side thereof from the first outermost place in the slots 15b after cut off at the connecting portions. Thus, this crossover connection portion is placed at the outer-diameter-side of the coil end portion and positioned between the coil end portion and the bracket. Therefore, neither the height of the coil end portion nor the wind resistance at the discharge side of the fan 5 is increased by forming the crossover connection portion. Consequently, the total air quantity of the fans is restrained from decreasing, so that the temperature of each part of the generator is prevented from rising. Moreover, the connecting portion 30b of the coil piece 30, which serves to reduce the height of the coil end portion, is placed at the rear side of the stator. Thus, the wind resistance decreases at the discharge side of the rear-side fan. Consequently, the rear-side internal fittings, such as the rectifier 12 and the regulator 18, are efficiently cooled.

Furthermore, the rear-side coil end portions have no axial projections due to the crossover connection portion. This prevents the generation of higher-order discomfort interference noises between the coil end portion and the fan 5 or the coil end portion and the shoulder of the claw-like magnetic pole 23 of the pole core 21. Consequently, wind noises are reduced.

Additionally, in the conventional generator, a mixed condition of the crossover connection portion and the constituent coils of the coil end portions is apt to damage the coils. However, in the case of this stator coil 36, the crossover connection portion is placed at the outside-diameter side of the coil end portion, so that the coils are prevented from being damaged and that high quality output and performance are achieved.

Furthermore, the apex portions 30d of the connecting portions 30b of coil pieces 30 constituting the stator coil 36 are aligned as two rows in the radial direction and are arranged in the circumferential direction, so that the height of the coil end portion is small and the wind resistance at the discharge side of each of the fans decreases. Consequently, the total air quantity of the fans increases, and the cooling ability of the generator is enhanced.

The apex portions 30d of the connecting portions 30b are exposed in the axial direction, so that the open-end portions 30c thereof are of the same uniform height by chucking the stator core 15 and holding a plane jig to the apex portions 30d of the connecting portions 30b of all coil pieces 30 in the jointing process of the open-end portions of the coil pieces 30 before the open-end portions 30c are jointed. Thus, when the open-end portions 30c are jointed, the height of the open-end portions 30c are maintained uniformly, so that the open-end portions 30c are jointed in such a stable condition and the workability in jointing between the open-end portions 30c is enhanced.

Furthermore, the height of the coil end portion constituted by the connecting portions 30b of the coil pieces 30 in the axial direction is smaller than that of the coil end portion constituted by jointing the open-end portions 30c thereof. The coil end portion constituted by the connecting portions 30b of the coil pieces 30 is disposed at the rear side. Thus, the height of the rear-side coin end portion 36r is lower than that of a front-side coil end portion 36f so that the wind resistance at the rear side decreases, that is, the air quantity at the rear side increases. Consequently, the rear-side internal fittings, such as the rectifier 12 and the regulator 18, are efficiently cooled.

As the fans 5 are disposed at both axial ends of the rotor 7, a front-side cooling air path in which the outer air is sucked in from the intake openings 1a, cools the front-side coil end portion of the stator coil 36 and then is discharged to the outside from the exhaust opening 1b and a rear-side cooling air path in which the outer air is sucked in from the intake openings 2a, respectively, cooling the rectifier 12 and the regulator 18, cools the rear-side coil end portion of the stator coil 36 and then is discharged to the outside from the exhaust opening 2b are formed, realizing the good cooling ability.

In the first embodiment, it is to be desired that the axial lap amount between the front-side coil end portion and the fan 5 is larger than that between the rear-side coil end portion and the fan 5. Accordingly, the rear-side cooling air path has a high wind resistance as the rectifier 12 and the regulator 18 are disposed in the rear-side cooling air path. On the other hand, the front-side cooling air path has a low wind resistance as there is no internal fittings in the front-side cooling air path. Thus, the wind resistance of the rear-side cooling air path due to the rear-side coil end portion is restrained from increasing by decreasing the axial lap amount between the rear-side coil end portion and the fan 5, so that the rectifier 12 and the regulator 18 are efficiently cooled by the cooling air flowing through the rear-side cooling air path. On the other hand, the wind resistance of the front-side cooling air path is not particularly increased even if the axial lap amount between the front-side coil end portion and the fan 5 is increased, because the front-side cooling air path has a low wind resistance due to no internal fittings. Further, since there is no internal fittings in the front-side cooling air path, it is possible to suppress temperature increases in the cooling air flowing through the front-side cooling air path and the area of the front-side coil end portion on which the cooling air hits is increased. Thus, the large area of the front-side coil end portion is exposed to the cooling air, enabling temperature increases in the stator coil to be efficiently suppressed.

Furthermore, in the first embodiment, it is to be desired that gaps between the apex portion of the rear-side coil end portion and the opposite plane of the rear bracket 2 opposite to the apex portion thereof, between the apex portion thereof and the rectifier 12 and between the apex portion thereof and the regulator 18 are uniformly formed in the circumferential direction. Accordingly, the cooling air paths constituted by the apex portion of the coil end portion and the opposite plane of the rear bracket 2, and by the apex portion of the coil end portion and the rectifier 12 and the regulator 18 are formed so as to have a uniform gap in the circumferential direction, respectively. Thus, it is possible to suppress fluctuations in the wind resistance of the cooling air paths in the circumferential direction. Consequently, overall wind resistance of the cooling air path is reduced, enabling the good cooling ability of the rectifier 12 and the regulator 18 to be secured.

Furthermore, in the first embodiment, it is to be desired that the front-side exhaust wind volume is larger than the rear-side exhaust wind volume. Accordingly, the front-side exhaust air which is possible to cool the coil end portion efficiently increases in wind volume compared with the rear-side exhaust air, enabling. Consequently, the stator coil is efficiently cooled, enabling temperature increases in the rectifier 12 and the regulator 18 to be suppressed. Furthermore, the front-side exhaust wind volume having a low wind resistance increases compared with the rear-side exhaust wind volume having a high wind resistance, preventing wind noise from being deteriorated.

Incidentally, in the foregoing description of the first embodiment, it has been described that the leg portions of the nearly U-shaped coil pieces are inserted into the first outermost place in one of two slots 15b, whose slot numbers differ from each other by three, and into the fourth outermost place in the other slot 15b, whose slot number differs from that of the former one 15b in the clockwise circumferential direction in FIG. 1, and that the connecting portions 30b (namely, the rear-side coil end portions) of the coil pieces 30 are, thereafter, cut off. However, the present invention is not limited to this generator. The generator according to be present invention may be adapted so that rod-like coil pieces are inserted into the first outermost place in one of two slots 15b, whose slot numbers differ from each other by three, and into the fourth outermost place in the other slot 15b, whose slot number differs from that of the former one 15b in the clockwise circumferential direction in FIG. 1 in such a way as to axially extend to both sides thereof. This obviates the necessity of cutting off the connecting portions 30b of the coil pieces 30.

Further, in the first embodiment, it has been described that the crossover connection portion u2'-u3 is configured by overlapping and connecting the end portions u2' and u3 of each coil piece 30, which extend toward the rear side thereof from the first outermost place in the slots 15b after cut off at the connecting portions. However, the crossover connection portion u2'-u3 may be configured by overlapping and connecting the end portions u1 and u4' of each coil piece 30, which extend toward the rear side thereof from the fourth outermost place in the slots 15b after cut off at the connecting portions. In this case, the end portions u2' and u3 of each coil piece 30, which extend toward the rear side thereof from the first outermost place in the slots 15b after cut off at the connecting portions, are connected to the rectifier 12 as a lead wire and to a neutral point in a star three-phase connection among this coil and coils respectively corresponding to other two phases, respectively.

Furthermore, in the first embodiment, it has been described that the apex portions 30d of the connecting portions of the coil pieces 30 constituting the stator coil 36 are radially aligned in two rows and are arranged in the circumferential direction. However, the apex portions 30d may be arranged in a single row in the circumferential direction, enabling the same effects to be achieved.

Furthermore, in the first embodiment, it has been described that the fans 5 are fixed to both axial ends of the rotor 7. However, the fans 5 are not necessarily disposed at both axial ends of the rotor 7. The fan 5 may be fixed to the only rear-side axial end of the rotor 7. In this case, though cooling efficiency in the front-side coil end portion is reduced, a flow of the cooling air is formed by the rotation of the fan 5 at the rear side, cooling the rectifier 12 and the regulator 18 and then cooling the rear-side coil end portion, enabling temperature increases in the stator coil to be suppressed. Further, the fan 5 is disposed at only the rear side of the rotor 7, enabling costs to be lowered.

Second Embodiment

Figure 4:
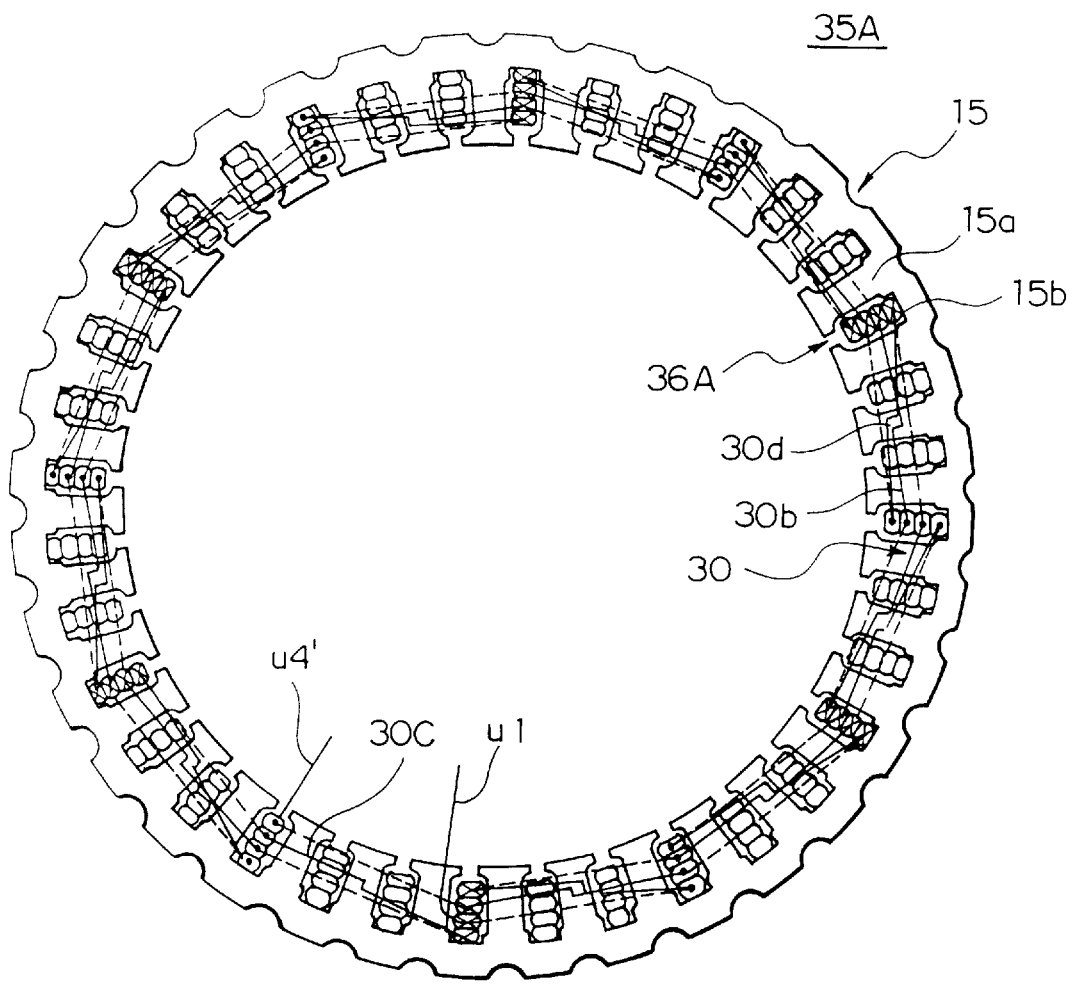
FIG. 4 is a rear elevation illustrating the coil connection of a stator applied to a vehicular AC generator, which is a second embodiment of the present invention.
Figure 5:
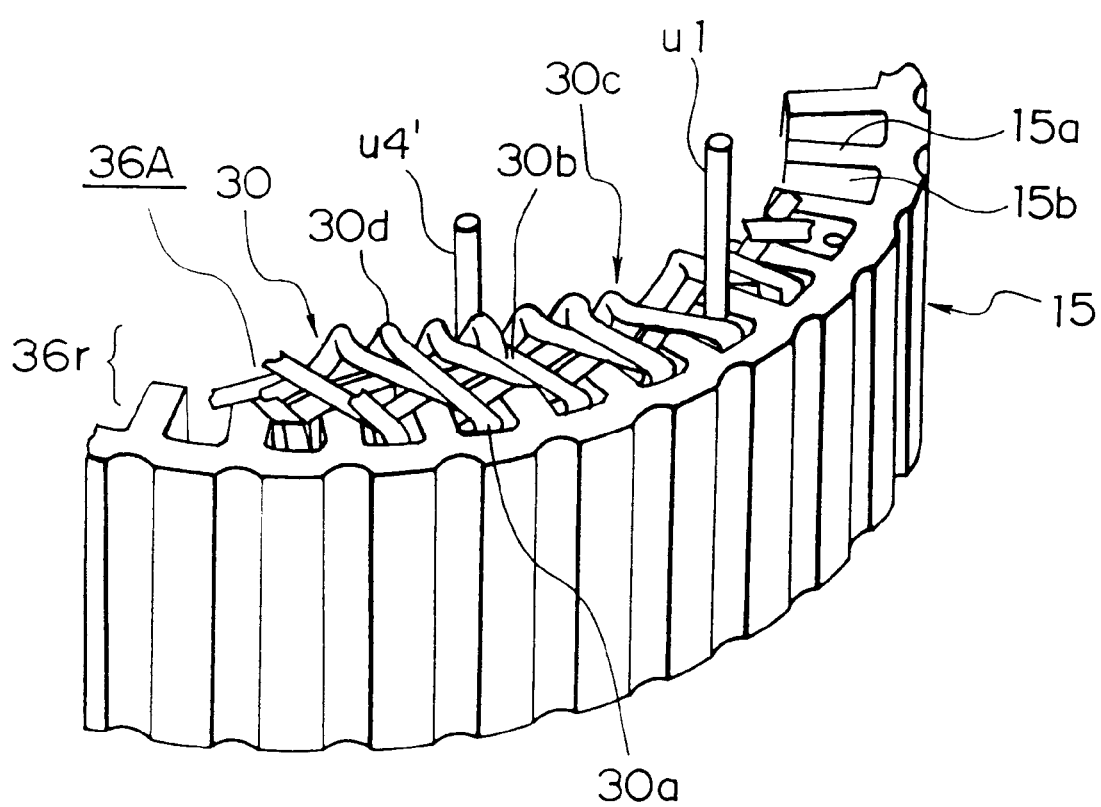
FIG. 5 is a perspective view of a primary part of the stator applied to the vehicular AC generator, which is the second embodiment of the present invention, viewed from the rear side thereof.

FIG. 4 is a rear elevation illustrating the coil connection of a stator applied to a vehicular AC generator, which is the second embodiment of the present invention. FIG. 5 is a perspective view of a primary part of the stator applied to the vehicular AC generator, which is the second embodiment of the present invention, viewed from the rear side thereof.

As shown in FIGS. 4 and 5, two coil pieces 30 are inserted from the rear side of the stator core 15 into each of the slots 15b whose slot numbers differ by three from each other. At that time, four leg portions 30a are radially arranged in a line and accommodated in each of the slots 15b. Further, two leg portions 30a of each of the coil pieces 30 are sequentially inserted into the second outermost place in a slot 15b and the third outermost place in another slot 15b, which is the third slot from the former slot 15b in the clockwise circumferential direction in FIG. 4. Moreover, two leg portions 30a of another coil piece 30 are serially inserted into the first outermost place in a slot 15b and into the fourth outermost place in another slot 15b, which is the third slot from the former slot 15b in the clockwise circumferential direction in FIG. 4, in such a manner as to get the apex portion (return portion) of the connecting portion 30b thereof between the apex portions of the connecting portions 30b of the coil pieces 30 having leg portions precedingly inserted into the second outermost place in a slot 15b and into the third outermost place in another slot 15b, which is the third slot from the former slot 15b. Thus, the rear-side coil end portion is configured by arranging the apex portions of the connecting portions 30b of the coil pieces 30 in a single row in the circumferential direction as shown in FIG. 5.

Incidentally, the slot inserting positions, into which leg portions of a coil piece 30 are inserted, in one set of the slots 15b, whose slot numbers differ from each other by three, are set to differ from those in other sets of such two slots 15b. Namely, in the one set of two slots 15b, the leg portions of one coil piece 30 are respectively inserted into the first outermost place in one of the two slots 15b from the outer-circumference and into the third outermost place in the other slot 15b, whose slot number differs from that of the former slot 15b by three in the clockwise circumference direction in FIG. 4. Moreover, the leg portions of the other coil piece 30 are respectively inserted into the second outermost place in one of the two slots 15b and into the fourth outermost place in the other slot 15b, whose slot number differs from that of the former slot 15b by three in the clockwise circumferential direction in FIG. 4.

Additionally, the coil piece 30 corresponds to a second coil piece, which has leg portions respectively inserted into the second outermost place in one of these two slots 15b from the outer-circumference and into the fourth outermost place in the other slot 15b, whose slot number differs from that of the former slot 15b by three in the clockwise circumference direction in FIG. 4. The other coil piece 30 corresponds to a first coil piece.

Subsequently, in the case of each coil piece 30 having leg portions respectively inserted into the second outermost place in a slot 15b and into the third outermost place in another slot 15b, the open-end portions thereof extending from the slot 15b toward the front side of the stator core 15 are bent in such a way as to outwardly open, that is, bent outwardly. Furthermore, in the case of each coil piece 30 having leg portions respectively inserted into the first outermost place in a slot 15b and into the fourth outermost place in another slot 15b, the open-end portions thereof extending from the slot 15b toward the front side of the stator core 15 are bent inwardly. Further, in the case of each coil piece 30 having leg portions respectively inserted into the first outermost place in a slot 15b and into the third outermost place in another slot 15b, the open-end portion thereof extending from the first outermost place in the slot 15b toward the front side of the stator core 15 is bent inwardly, and the open-end portion thereof extending from the third outermost place in the slot 15b toward the front side of the stator core 15 is bent outwardly. Moreover, in the case of each coil piece 30 having leg portions respectively inserted into the second outermost place in a slot 15b and into the fourth outermost place in another slot 15b, the open-end portion thereof extending from the second outermost place in the slot 15b toward the front side of the stator core 15 is bent outwardly, and the open-end portion thereof extending from the fourth outermost place in the slot 15b toward the front side of the stator core 15 is bent inwardly.

Furthermore, the open-end portion 30c of the coil piece 30 extending to the front side of the stator core 15 from the second outmost place in the corresponding slot 15b, as indicated by dotted lines in FIG. 4, is made to overlap with the open-end portion 30c of another coil piece 30 extending to the front side from the first outmost place in another slot 15b, whose slot number differs from that of the former slot 15b by 3 in the counterclockwise circumferentially, as illustrated in FIG. 4. Then, these open-end portions 30c are crimped with a clip. Subsequently, these open-end portions 30c are soldered to each other. Similarly, the open-end portion 30c of the coil piece 30 extending to the front side of the stator core 15 from the third outmost place in the corresponding slot 15b, as indicated by dotted lines in FIG. 4, is made to overlap with the open-end portion 30c of another coil piece 30 extending to the front side from the fourth outmost place in another slot 15b, whose slot number differs from that of the former slot 15b by 3 in the clockwise circumferentially, as illustrated in FIG. 4. Then, these open-end portions 30c are crimped with a clip. Subsequently, these open-end portions 30c are soldered to each other.

Thus, a first two-turn coil and a second two-turn coil each consisting of twelve connected coil pieces 30 are connected at the connecting portion 30b of the coil piece 30C having leg portions respectively inserted into the first outermost place in one slot 15b and into the third outermost place in another slot 15b, whose slot number differs from that of the former slot 15b. Thus, a four-turn coil constituted by connecting 24 coil pieces 30 is obtained.

Subsequently, the connecting portion 30b (thus, the rear-side coil end portions) is cut off from the coil piece 30 having leg portions respectively inserted into the second outermost place in one slot of the one set of the slots 15b, whose slot number differs from each other by three, and into the fourth outermost place in another slot 15b. Then, end portions u1 and u4' of the coil piece 30, which are cut off therefrom, respectively extend from the second and fourth places in the slot 15b to the rear side of the stator core 15, as illustrated in FIG. 5. The end portion u1 acts as a lead wire, and the end portion u4' is connected to a neutral point.

Furthermore, coils corresponding to other two phases are similarly produced. Further, the end portion u1 of the cut coil piece 30 is connected to the rectifier 12 as a lead wire. Moreover, the end portion u4' of this coil piece 30 is connected to a neutral point in a star three-phase connection among this coil and coils respectively corresponding to other two phases. Thus, a stator 35A is obtained.

Further, the u2'-u3 connection portion is necessary for the stator coil 36 of the aforementioned first embodiment. However, in the case of the stator coil 36A of the second embodiment, the connecting portion 30b of the coil piece 30C corresponds to the u2'-u3 connecting portion. Incidentally, the coil piece 30C has leg portions respectively inserted into the first outermost place in one of the slots 15b and into the third outermost place in the other slot 15b, whose slot number differs from that of the former slot 15b by three in the circumferential direction. Thus, the second embodiment obviates the crossover connection portion.

According to this second embodiment, the connecting portion 30b of the stator coil 30C is substituted for the crossover connection portion between the four-turn coils constituting each constituent phase coil of the stator coil 36A. Consequently, the second embodiment obviates the crossover connection portion.

Thus, the second embodiment obviates the work of cutting, bending and drawing the coil pieces so as to form the crossover connection portion. Consequently, the workability thereof is considerably enhanced.

Moreover, the risk of a break in the crossover connection portion due to vibrations of the vehicular AC generator is eliminated. Consequently, an occurrence of power-generation failure owing to the break in the crossover connection portion is prevented.

Further, because the crossover connection portion is eliminated, the height of the coil end portion is reduced. Thus, the wind resistance at the discharge side of the fan 5 is decreased. Consequently, the total air quantity of the fans is restrained from decreasing, so that the temperature of each part of the generator is prevented from rising. Especially, the rear-side internal fittings, such as the rectifier 12 and the regulator 18, are efficiently cooled.

Furthermore, the coil end portions have no axial projections due to the crossover connection portion. This prevents the generation of higher-order discomfort interference noises between the coil end portion and the fan 5 or the coil end portion and the shoulder of the claw-like magnetic pole 23 of the pole core 21. Consequently, wind noises are reduced.

Additionally, if the crossover connection portion is placed between the coil end portion and the bracket, similarly as in the aforementioned first embodiment, an insulation failure between the crossover connection portion and the bracket may occur. However, such an insulation failure does not occur in the second embodiment.

Further, the second embodiment eliminates the risk of damage to the coils due to the mixed condition of the crossover connection portion and the coil of the coil end portion. Consequently, the second embodiment achieves high quality output and high performance.

Furthermore, because the apex portions of the connecting portions 30b of the coil pieces 30 constituting the stator coil 36A are arranged in a single row in the circumferential direction, the height of the coil end portion is reduced and the wind resistance at the discharge side of the fan is reduced. As a result, the total air quantity of the fans is increased, enabling cooling ability in the AC generator to be enhanced.

Furthermore, because the apex portions of the connecting portions 30b are exposed in the axial direction, the open-end portions 30c of the coil pieces 30 are soldered to each other in such a stable condition that the stator core 15 is chucked and the connecting portions 30b of the coil pieces 30 are held, enabling the workability in soldering between the open-end portions 30c to be enhanced.

Incidentally, in the foregoing description of the second embodiment, it has been described that the leg portions of the nearly U-shaped coil pieces are inserted into the second outermost place in one of two slots 15b, whose slot numbers differ from each other by three, and into the fourth outermost place in the other slot 15b, whose slot number differs from that of the former one 15b in the clockwise circumferential direction in FIG. 4, and that the connecting portion 30b (namely, the rear-side coil end portion) of the coil pieces 30 is, thereafter, cut off. However, the present invention is not limited to this generator. The generator according to be present invention may be adapted so that rod-like coil pieces are inserted into the second outermost place in one of two slots 15b, whose slot numbers differ from each other by three, and into the fourth outermost place in the other slot 15b, whose slot number differs from that of the former one 15b in the clockwise circumferential direction in FIG. 4 in such a way as to axially extend to both sides thereof. This obviates the necessity of cutting off the connecting portion 30b of the coil piece 30.

Further, in the foregoing description of the second embodiment, it has been described that the end portions u1 and u4' of the coil piece 30, which respectively extend toward the rear side thereof from the second and fourth outermost places in the slots 15b after cut off therefrom, serve as a lead wire connected to the rectifier 12 and a wire connected to a neutral point among this coil and coils respectively corresponding to other two phases. However, the end portions u1 and u4' may be respectively used as a wire connected to the neutral point and a lead wire connected to the rectifier 12.

Third Embodiment

Figure 6:
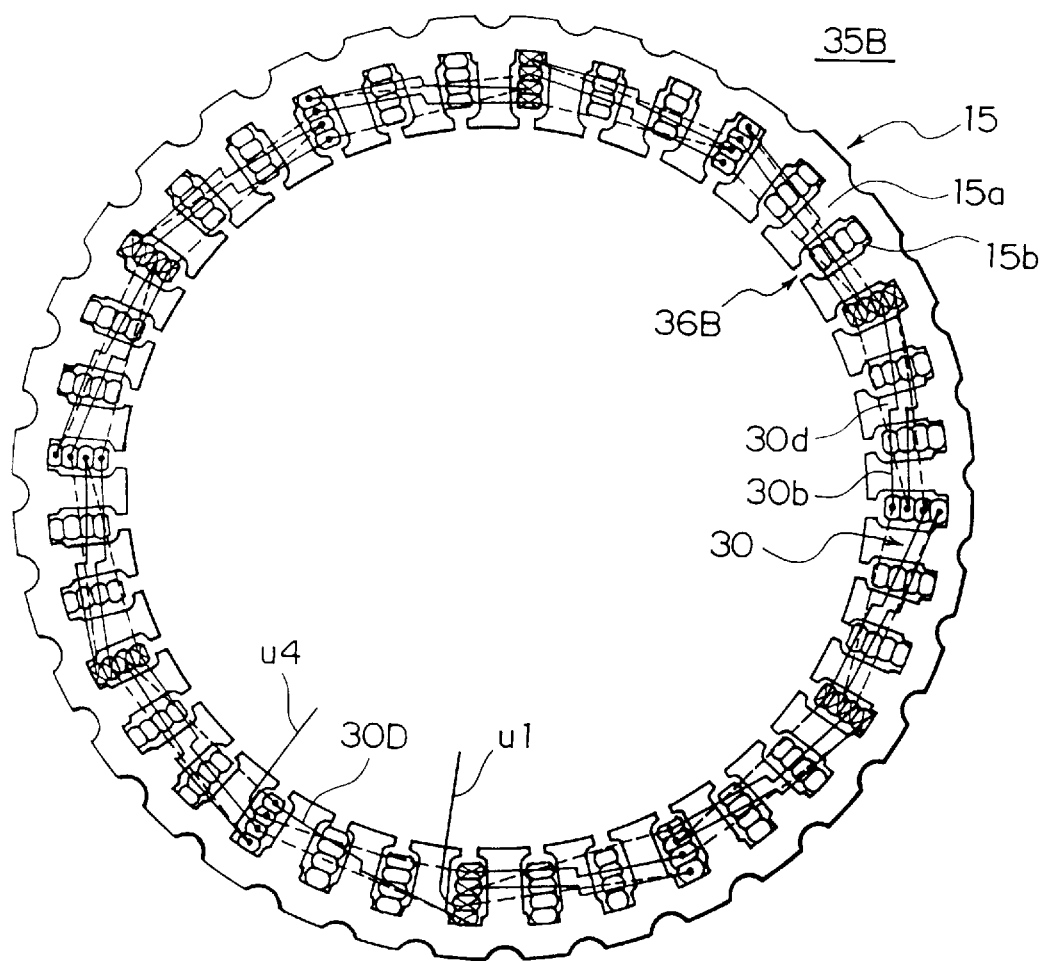
FIG. 6 is a rear elevation illustrating the coil connection of a stator applied to a vehicular AC generator, which is a third embodiment of the present invention.
Figure 7:
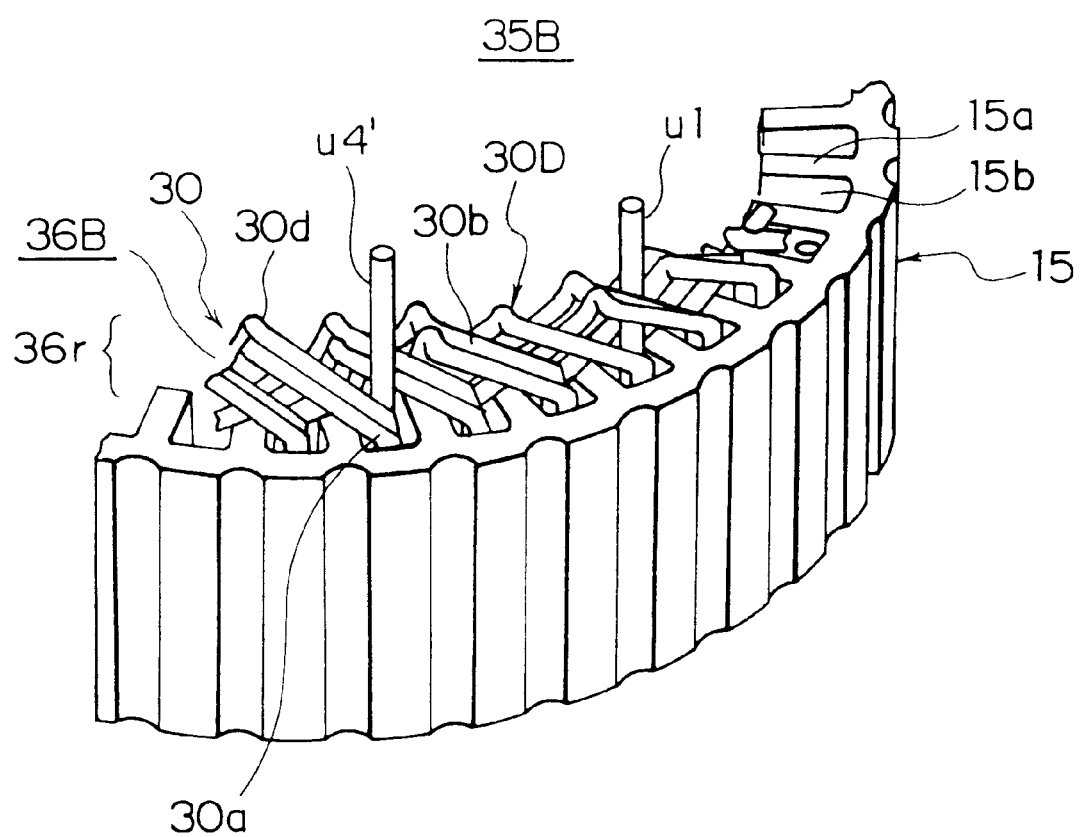
FIG. 7 is a perspective view of a primary part of a stator applied to a vehicular AC generator, which is the third embodiment of the present invention.
Figure 8:
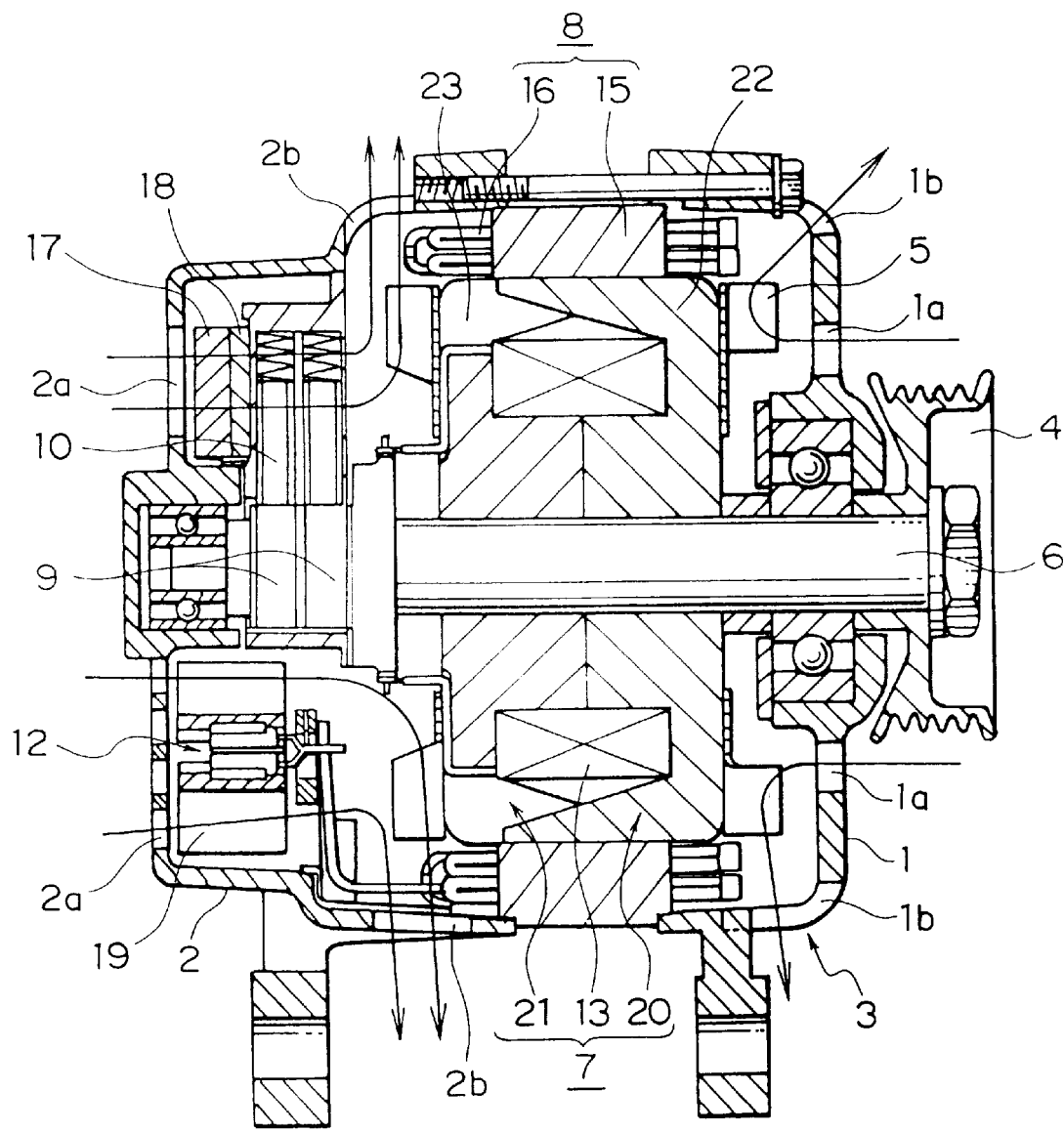
FIG. 8 is a sectional diagram showing the conventional vehicular AC generator.
Figure 9:
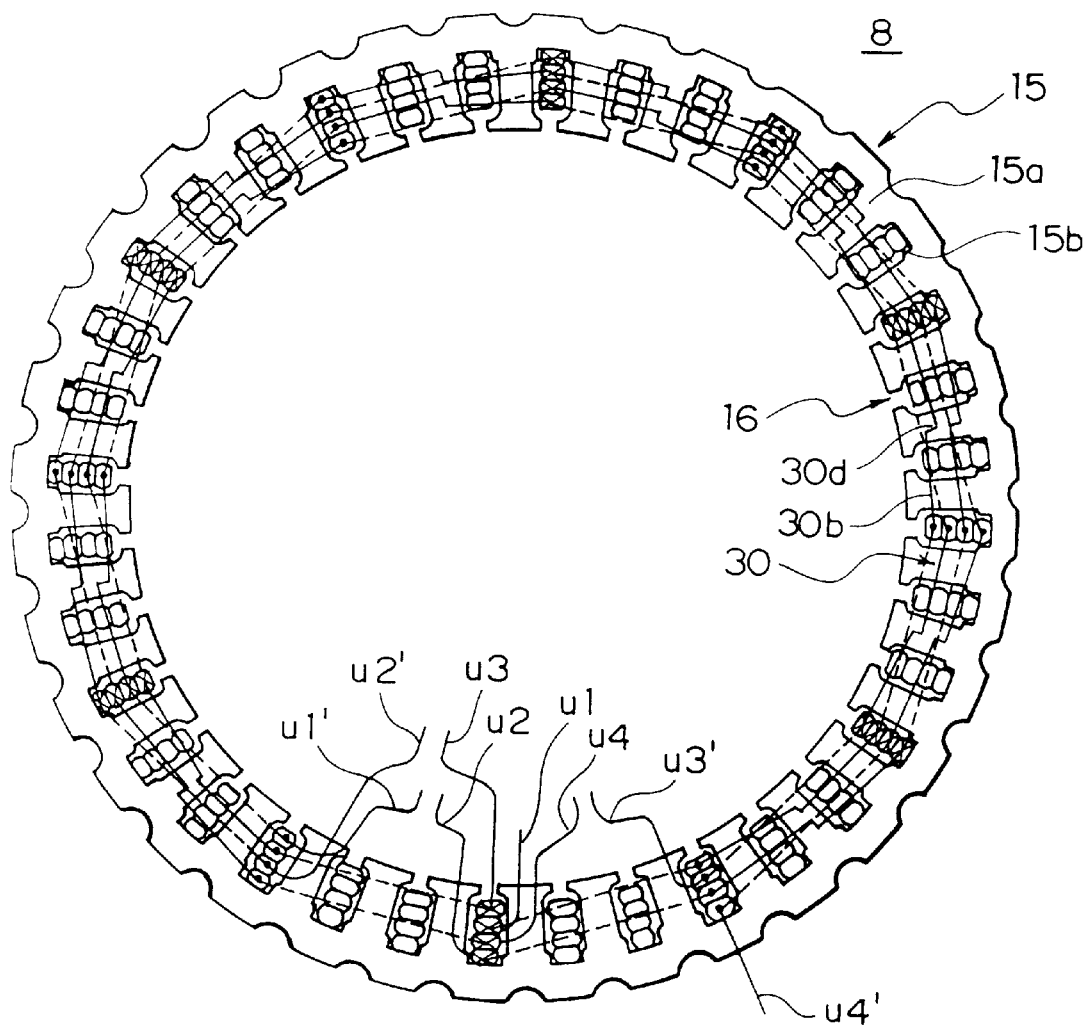
FIG. 9 is a rear elevation illustrating the coil connection applied to a conventional stator.
Figure 10:
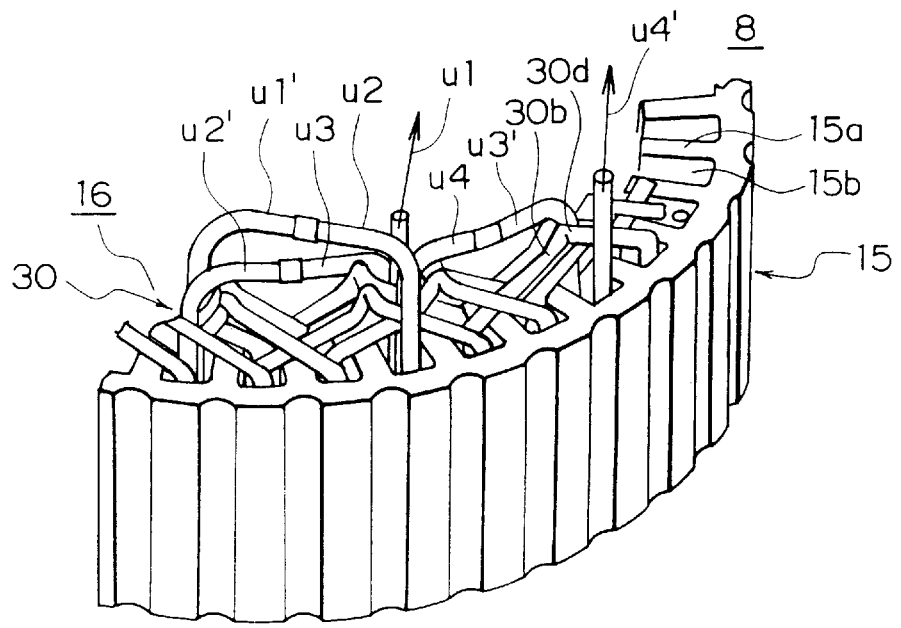
FIG. 10 is a perspective view of a primary part of the conventional stator, viewed from the rear side thereof.
Figure 11:
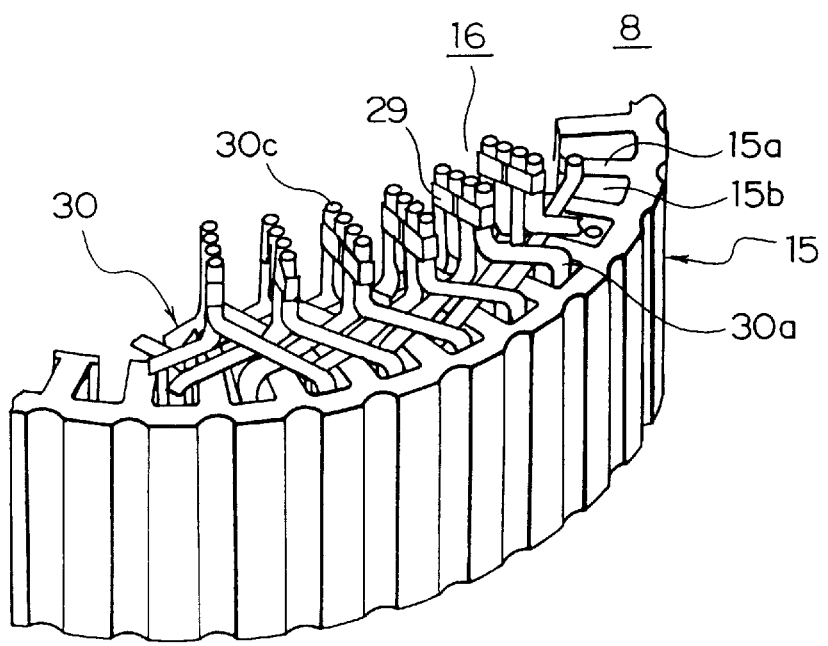
FIG. 11 is a perspective view of the primary part of the conventional stator, viewed from the front side thereof.
Figure 12:
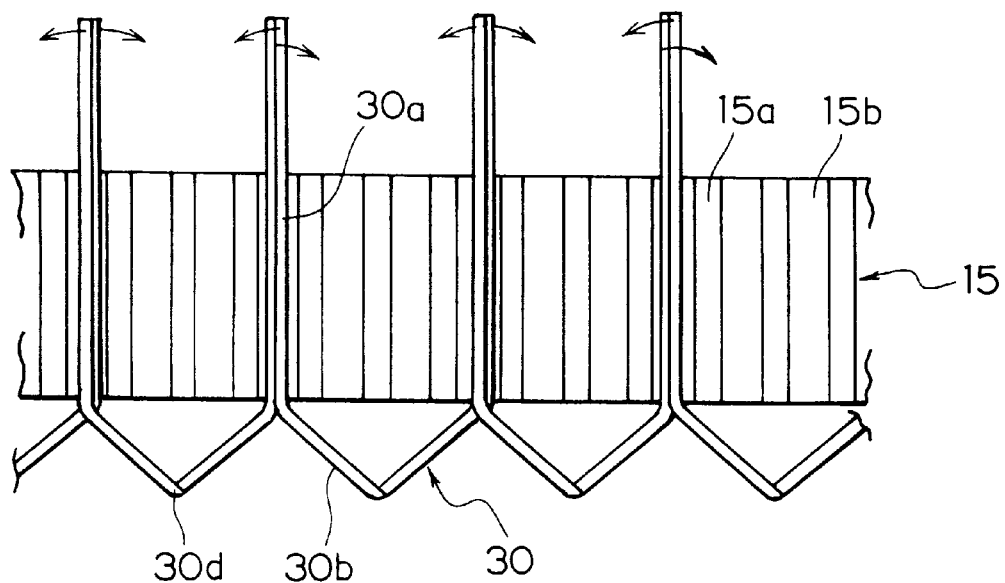
FIGS. 12 and 13 are schematic diagrams illustrating a method of winding the conventional stator coils.
Figure 13:
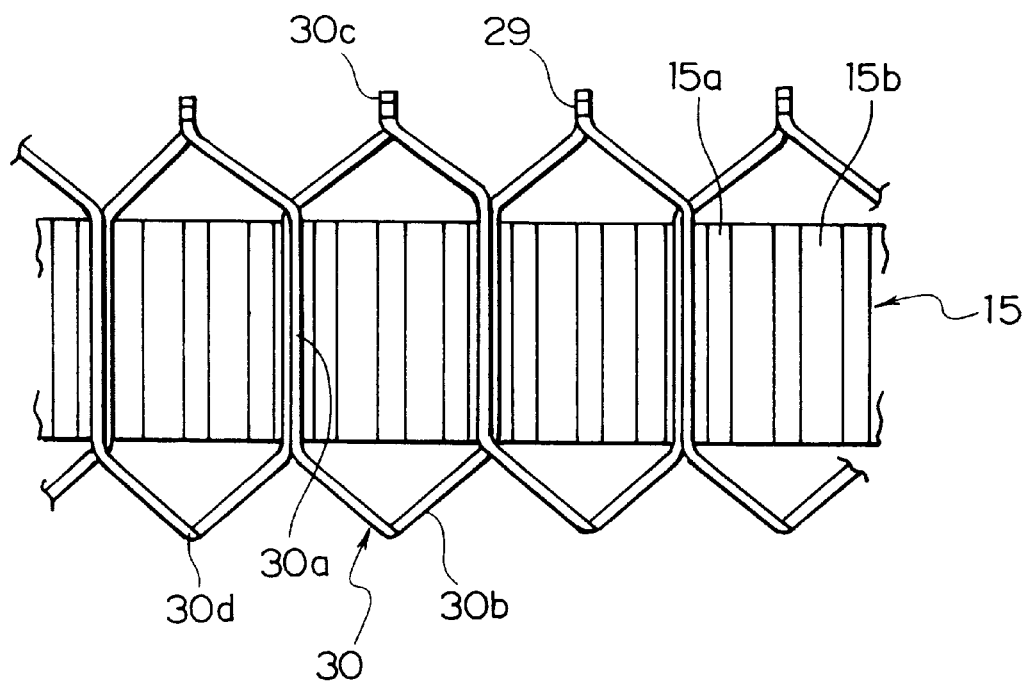
Figure 14:
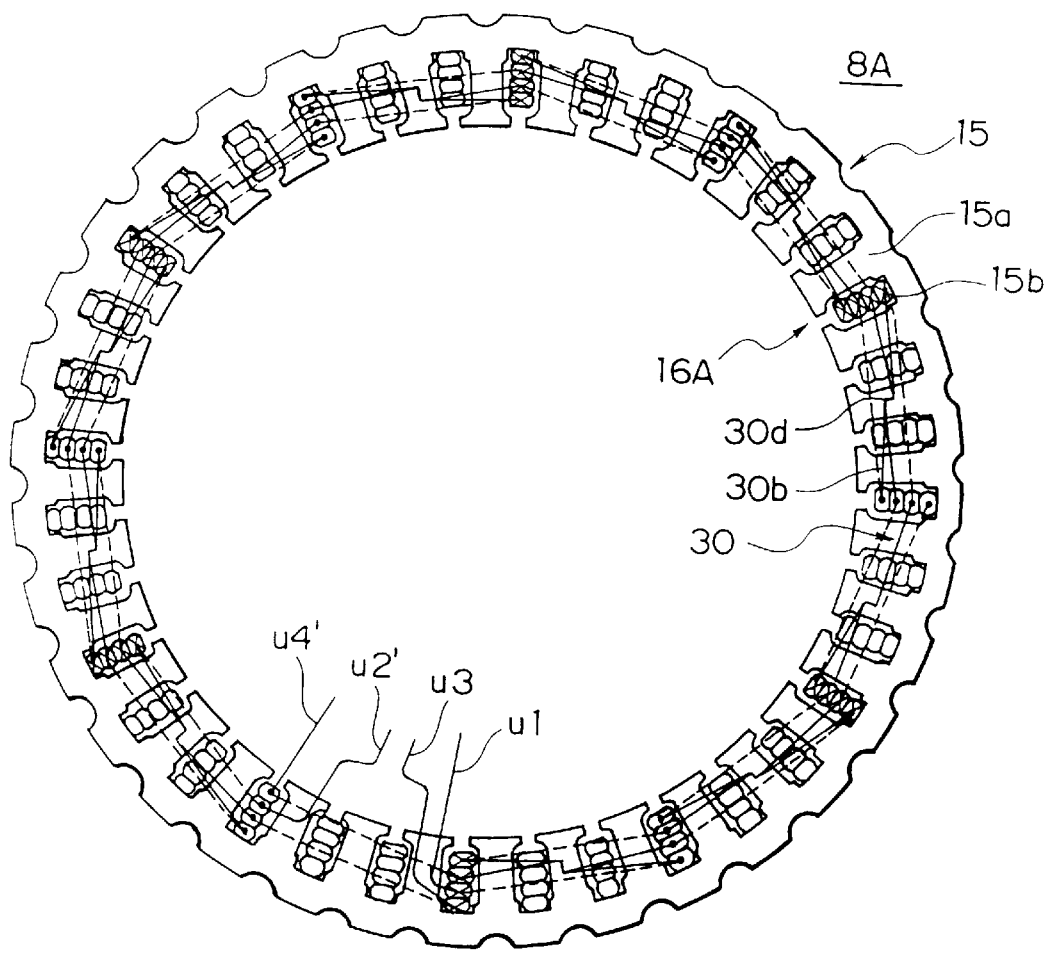
FIG. 14 is a rear elevation illustrating the coil connection of another conventional stator applied to the conventional vehicular AC generator.
Figure 15:
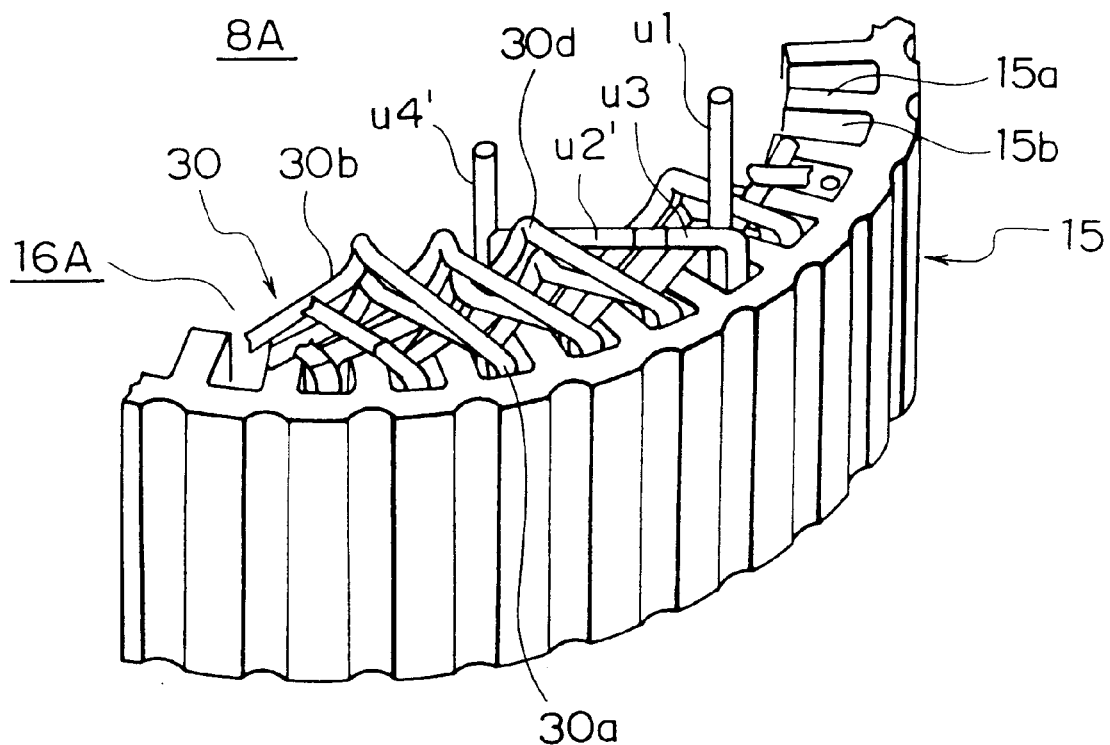
FIG. 15 is a perspective view of a primary part of another conventional stator applied to the conventional vehicular AC generator.

FIG. 6 is a rear elevation illustrating the coil connection of a stator applied to a vehicular AC generator, which is the third embodiment of the present invention. FIG. 7 is a perspective view of a primary part of the stator applied to the vehicular AC generator, which is the third embodiment of the present invention, viewed from the rear side thereof.

As shown in FIGS. 6 and 7, two coil pieces 30 are inserted from the rear side of the stator core 15 into each set of the slots 15b whose slot numbers differ by three from each other. At that time, four leg portions 30a are radially arranged in a line and accommodated in each of the slots 15b. Further, two leg portions 30a of each of the coil piece 30 are sequentially inserted into the first outermost place in a slot 15b and the third outermost place in another slot 15b, which is the third slot from the former slot 15b in the clockwise circumferential direction in FIG. 6. Moreover, two leg portions 30a of another coil piece 30 are serially inserted into the second outermost place in a slot 15b and into the fourth outermost place in another slot 15b, which is the third slot from the former slot 15b in the clockwise circumferential direction in FIG. 6. Thus, at the rear-side coil end portion, the apex portions of the connecting portions 30b of the coil pieces 30 are aligned in two rows in the radial direction and are arranged in the circumferential direction as shown in FIG. 7.

Incidentally, the slot inserting positions, into which leg portions of a coil piece 30 are inserted, in one set of the slots 15b, whose slot numbers differ from each other by three, are changed to those in the other sets of such two slots 15b. Namely, in this set of the slots 15b, the leg portions of one coil piece 30 (30D) are respectively inserted into the first outermost place in one of these two slots 15b from the outer-circumference and into the fourth outermost place in the other slot 15b, whose slot number differs from that of the former slot 15b by three in the clockwise circumference direction in FIG. 6. Moreover, the leg portions of the other coil piece 30 are respectively inserted into the second outermost place in one of the two slots 15b and into the third outermost place in the other slot 15b, whose slot number differs from that of the former slot 15*b* by three in the clockwise circumferential direction in FIG. 6.

Additionally, the coil piece 30 corresponds to a second coil piece, which has leg portions respectively inserted into the second outermost place in one of these two slots 15*b* from the outer-circumference and into the third outermost place in the other slot 15*b*, whose slot number differs from that of the former slot 15*b* by three in the clockwise circumference direction in FIG. 6. The other coil piece 30 corresponds to a first coil piece.

Subsequently, in the case of each coil piece 30 having leg portions respectively inserted into the first outermost place in a slot 15*b* and into the third outermost place in another slot 15*b*, the open-end portions thereof extending from the slot 15*b* toward the front side of the stator core 15 are bent inwardly. Furthermore, in the case of each coil piece 30 having leg portions respectively inserted into the second outermost place in a slot 15*b* and into the fourth outermost place in another slot 15*b*, the open-end portions thereof extending from the slot 15*b* toward the front side of the stator core 15 are bent in such a way as to outwardly open. Further, in the case of the coil piece 30 having leg portions respectively inserted into the first outermost place in a slot 15*b* and into the fourth outermost place in another slot 15*b*, the open-end portion thereof extending from the first outermost place in the slot 15*b* toward the front side of the stator core 15 are bent inwardly, and the open-end portion thereof extending from the fourth outermost place in the slot 15*b* toward the front side of the stator core 15 are bent outwardly. Moreover, in the case of the coil piece 30 having leg portions respectively inserted into the second outermost place in a slot 15*b* and into the third outermost place in another slot 15*b*, the open-end portion thereof extending from the second outermost place in the slot 15*b* toward the front side of the stator core 15 are bent outwardly, and the open-end portion thereof extending from the third outermost place in the slot 15*b* toward the front side of the stator core 15 are bent inwardly.

Furthermore, the open-end portion 30*c* of the coil piece 30 extending to the front side of the stator core 15 from the first outmost place in the corresponding slot 15*b*, as indicated by dotted lines in FIG. 6, is made to overlap with the open-end portion 30*c* of the coil piece 30 extending to the front side from the second outmost place in another slot 15*b*, whose slot number differs from that of the former slot 15*b* by three in the counterclockwise circumferentially, as illustrated in FIG. 6. Then, these open-end portions 30*c* are crimped with a clip. Subsequently, these open-end portions 30*c* are soldered to each other. Similarly, the open-end portion 30*c* of the coil piece 30 extending to the front side of the stator core 15 from the third outmost place in the corresponding slot 15*b*, as indicated by dotted lines in FIG. 6, is made to overlap with the open-end portion 30*c* of the coil piece 30 extending to the front side from the fourth outmost place in another slot 15*b*, whose slot number differs from that of the former slot 15*b* by three in the counterclockwise circumferentially, as illustrated in FIG. 6. Then, these open-end portions 30*c* are crimped with a clip. Subsequently, these open-end portions 30*c* are soldered to each other.

Thus, a first two-turn coil and a second two-turn coil consisting of twelve connected coil pieces 30 are connected at the connecting portion 30*b* of the coil piece 30D having leg portions respectively inserted into the first outermost place in one slot 15*b* and into the fourth outermost place in another slot 15*b*, whose slot number differs from that of the former slot 15*b*. Thus, a four-turn coil constituted by connecting 24 coil pieces 30 is obtained.

Subsequently, the connecting portion 30*b* (thus, the rear-side coil end portion) is cut off from the coil piece 30 having leg portions respectively inserted into the second outermost place in one slot of a set of the slots 15*b* and into the third outermost place in another slot 15*b*, whose slot number differs by three from that of the former slot 15*b*. Then, end portions u1 and u4' of the coil piece 30, which are cut off therefrom and respectively extend from the second and third places in the slots 15*b* to the rear side of the stator core 15, as illustrated in FIG. 6. The end portion u1 acts as a lead wire, and the end portion u4' is connected to a neutral point.

Furthermore, coils corresponding to other two phases are similarly produced.

Further, the end portion u1 of the cut coil piece 30 is connected to the rectifier 12 as a lead wire. Moreover, the end portion u4' of this coil piece 30 is connected to a neutral point in a star three-phase connection among this coil and coils respectively corresponding to other two phases. Thus, a stator 35B is obtained.

Further, the u2'-u3 connection portion is necessary for the stator coil 36 of the aforementioned first embodiment. However, in the case of the stator coil 36B of the third embodiment, the connecting portion 30*b* of the coil piece 30D corresponds to the u2'-u3 connection portion. Incidentally, the coil piece 30D has leg portions respectively inserted into the first outermost place in one of the slots 15*b* and into the fourth outermost place in another slot 15*b*, whose slot number differs from that of the former slot 15*b* by three in the circumferential direction. Thus, the third embodiment obviates the crossover connection portion.

According to this third embodiment, the connecting portion 30*b* of the stator coil 30D is substituted for the crossover connection portion between the four-turn coils constituting each constituent phase coil of the stator coil 36B. Consequently, the third embodiment obviates the crossover connection portion.

Thus, the third embodiment obviates the work of cutting, bending and drawing the coil pieces so as to form the crossover connection portion. Consequently, the workability thereof is considerably enhanced.

Moreover, the risk of a break in the crossover connection portion due to vibrations of the vehicular AC generator is eliminated. Consequently, an occurrence of power-generation failure owing to the break in the crossover connection portion is prevented.

Further, because the crossover connection portion is eliminated, the height of the coil end portion is reduced. Thus, the wind resistance at the discharge side of the fan 5 is decreased. Consequently, the total air quantity of the fans is restrained from decreasing, so that the temperature of each part of the generator is prevented from rising. Especially, the rear-side internal fittings are efficiently cooled.

Furthermore, the coil end portions have no axial projections due to the crossover connection portion. This prevents the generation of higher-order discomfort interference noises between the coil end portion and the fan 5 or the coil end portion and the shoulder of the claw-like magnetic pole 23 of the pole core 21. Consequently, wind noises are reduced.

Additionally, if the crossover connection portion is placed between the coil end portion and the bracket, similarly as in the aforementioned first embodiment, an insulation failure between the crossover connection portion and the bracket may occur. However, such an insulation failure does not occur in the third embodiment.

Further, the third embodiment eliminates the risk of damage to the coils due to the mixed condition of the crossover connection portion and the coil of the coil end portion. Consequently, the third embodiment achieves high quality output and high performance.

Furthermore, the coil pieces 30 of each phase coil is configured by having nearly the same shape. Thus, there is little overlap between the coil pieces. Consequently, the height of the coil end portion is reduced to a small value. Moreover, the damage to the coil is reduced.

Furthermore, because the apex portions of the connecting portions 30b of the coil pieces 30 constituting the stator coil 36B are arranged in a single row in the circumferential direction, the height of the coil end portion is reduced and the wind resistance at the discharge side of the fan is reduced. As a result, the total air quantity of the fans is increased, enabling cooling ability in the AC generator to be enhanced.

Furthermore, because the apex portions of the connecting portions 30b are exposed in the axial direction, the open-end portions 30c of the coil pieces 30 are soldered to each other in such a stable condition that the stator core 15 is chucked and the connecting portions 30b of the coil pieces 30 are held, enabling the workability in soldering between the open-end portions 30c to be enhanced.

Incidentally, in the foregoing description of the third embodiment, it has been described that the leg portions of the nearly U-shaped coil pieces 30 are inserted into the second outermost place in one of two slots 15b, whose slot numbers differ from each other by three, and into the third outermost place in the other slot 15b, whose slot number differs from that of the former one 15b in the clockwise circumferential direction in FIG. 6, and that the connecting portions 30b (namely, the rear-side coil end portions) of the coil pieces 30 are, thereafter, cut off. However, the present invention is not limited to this generator. The generator according to be present invention may be adapted so that the rod-like coil pieces are inserted into the second outermost place in one of two slots 15b, whose slot numbers differ from each other by three, and into the third outermost place in the other slot 15b, whose slot number differs from that of the former one 15b in the clockwise circumferential direction in FIG. 6 in such a way as to axially extend to both sides thereof. This obviates the necessity of cutting off the connecting portions 30b of the coil pieces 30.

Further, in the foregoing description of the third embodiment, it has been described that the end portions u1 and u4' of the coil piece 30, which respectively extend toward the rear side of the stator core 15 from the second and third outermost places in the slots 15b after cut off therefrom, serve as a lead wire connected to the rectifier 12 and a wire connected to a neutral point among this coil and coils respectively corresponding to other two phases. However, the end portions u1 and u4' may be respectively used as a wire connected to the neutral point and a lead wire connected to the rectifier 12.

Incidentally, in the foregoing descriptions of the aforementioned embodiments, the three phase AC generators having the slots, of which the number corresponding to each phase and to each pole is 1, have been described. However, needless to say, the present invention can be applied to a three phase AC generator having slots of which the number corresponding to each phase and to each pole is 2 or more, and to other multi-phase AC generators, such as a six phase AC generator. Further, as the number of slots corresponding to each phase and to each pole and the number of phases increase, the number of crossover connections increases, so that the advantageous effects of the present invention are brought into the fore.

Moreover, each of the aforementioned embodiments uses a round coil having a circular section as the coil piece 30. However, a flat coil having a rectangular section may be used as the coil piece 30.

Furthermore, in each of the embodiments, the open-end portions 30c of the coil pieces 30 are made to overlap with each other, and then crimped by using the a clip, and subsequently, soldered to each other. Thus, the coil pieces are connected to each other by soldering. However, means for connecting the open-end portions 30c of the coil pieces 30 is not limited to soldering. For example, the open-end portions 30c may be connected to each other by welding.

Furthermore, in each of the embodiments, the aftertreatment of the coil end portion is described nowhere. However, the coil end portion may be impregnated with any insulating resin. In this case, insulating ability in the connected portions is enhanced. Moreover, because the crossover connection portion is integrally fixed to the coil end portion, the risk of a brake in the crossover connection portion due to vibration of the vehicular AC generator is reduced.

The vehicular AC generator of the present invention is constructed as described above, and thus has the following advantageous effects.

According to the present invention, there is provided a vehicular AC generator which comprises:

a shaft rotatably supported on a pair of brackets;

a rotor fixed to the shaft and disposed in the pair of brackets;

a stator disposed at an outer-circumference-side of the rotor and fixed to the pair of brackets;

internal fittings placed at a rear side of the rotor; and a fan driven by a rotation of the shaft and for forming a flow of cooling air flowing along an axis of the shaft, wherein the stator comprising:

a stator core in which a plurality of slots, whose grooves extend in an axial direction, are circumferentially provided at an equiangular pitch so as to open on an inner circumference side thereof; and a stator coil formed by AC connection of four-turn phase coils constructed by serially inserting coil conductors into the slots separated by a predetermined interval of the slots, the coil conductors being arranged four in a line in a radial direction, and wherein each of the phase coils comprises:

nearly U-shaped first coil pieces, which constitute the coil conductors, inserted from an axial side into two adjacent sets of two of the separated slots, respectively, so that the first coil pieces are respectively positioned at a third outermost place in one slot of each of the two sets and at a second outermost place in the other slot of each of the two sets, and remaining first coil pieces inserted from an axial side into remaining sets of two of the separated slots, respectively, so that one of the remaining first coil pieces is respectively positioned at a first outermost place in one slot of each of the remaining sets and at a second outermost place in the other slot of each of the remaining sets and that another of the remaining first coil pieces is respectively positioned at a third outermost place in the one slot of each of the remaining sets and at a fourth outermost place in the other slot of each of the remaining sets;

second coil pieces, which constitute the coil conductors, inserted into the two sets of two of the separated slots, respectively, so that the second coil pieces are respectively positioned at a first outermost place in the one slot of each of the two sets and at a fourth outermost place of the other slot of each of the two sets and that end portions of the second coil piece extend from each slot of the two sets to both axial sides;

a two-turn first coil formed by connecting an end portion of each of the first coil pieces, which extend from the second outermost place in each of the slots to an axial opposite side and are bent circumferentially outwardly, to a corresponding end portion of the first and second coil pieces, which extend from the first outermost place of the slot, whose slot number differs from that thereof by the predetermined interval of the slots, to the axial opposite side and are bent circumferentially outwardly;

a two-turn second coil formed by connecting an end portion of each of the first and second coil pieces, which extend from the fourth outermost place in the slots to the axial opposite side and are bent circumferentially outwardly, to a corresponding end portion of the first coil pieces, which extends from the third outermost place in the slot, whose slot number differs from that thereof by the predetermined interval of the slots, to the axial opposite side and is bent circumferentially outwardly; and a crossover connection portion between the first and second coils formed by connecting one of first and second sets of end portions of the second coil pieces, the first set of end portions of the second coil piece extending from the first outermost place in the one slot of each of the two sets to the axial side, the second set of end portions of the second coil piece extending from the fourth outermost place in the other slot of each of the two sets to the axial side, the other set of end portions being used as a lead wire and a wire connected to a neutral point formed among the phase coils.

Thus, the number of the crossover connection portions of the first and second coils corresponding to the phases is reduced to 1. Thus, the number of axial projections provided on the aligned coil end portions is decreased. Further, the wind resistance at the discharge side of the fan is reduced. Consequently, the cooling ability of the generator is enhanced. Moreover, the discomfort higher-order interference noises generated between the coil end portion and the rotor or the coil end portion and the fan are reduced. Furthermore, the wind noises are decreased. Moreover, the number of crossover connection portions formed by connecting the end portions of the second coil piece is reduced. Consequently, an occurrence of power generation failure due to a break in the crossover connection portions, which is caused by vibrations, is prevented.

According to an embodiment of the present invention, the second coil pieces are constructed by which nearly U-shaped coil pieces respectively are inserted from the axial side into the two sets of two of the separated slots so that the U-shaped coil pieces are respectively positioned at a first outermost place in one slot of each of the two sets and at a fourth outermost place in the other slot of each of the two sets, and each of the U-shaped coil pieces is cut off at each connecting portion (30b) thereof after inserted into the slots. Thus, the work of cutting, bending and drawing the second coil piece is reduced. Further, a process of assembling the stator coil is simplified. The assemblability of the stator is enhanced.

According to another embodiment of the present invention, each of the first coil pieces is formed by being folded at a connecting portion thereof, and wherein a direction, in which the first coil pieces respectively inserted into a first outermost place in one slot of each set of two of the separated slots and into a second outermost place in the other slot is folded at the connecting portion thereof, is the same with a direction, in which the first coil pieces respectively inserted into a third outermost place in one slot of each set of two of the separated slots and into a fourth outermost place in the other slot is folded at the connecting portion thereof, and is opposite to a direction, in which the first coil pieces respectively inserted into a third outermost place in one slot of each set of two of the separated slots and into a second outermost place in the other slot is folded at the connecting portion thereof. Thus, the interference between the crossover connection portion and the first coil is suppressed. Consequently, the size of the coil end portions is reduced.

According to another embodiment of the present invention, the crossover connection portion is formed in such a manner as to have a height which is less than that of a coil end portion constructed by a connecting portion of each of the first coil pieces. Thus, there is no axial projections of the crossover connection portion in the aligned coil end portions. Further, the wind resistance at the discharge side of the fan is decreased. The cooling ability of the generator is enhanced.

According to the present invention, there is provided a vehicular AC generator which comprises:

a shaft rotatably supported on a pair of brackets;

a rotor fixed to the shaft and disposed in the pair of brackets;

a stator disposed at an outer-circumference-side of the rotor and fixed to the pair of brackets;

internal fittings placed at a rear side of the rotor; and a fan driven by a rotation of the shaft and for forming a flow of cooling air flowing along an axis of the shaft, wherein the stator comprises:

a stator core in which a plurality of slots, whose grooves extend in an axial direction, are circumferentially provided at an equiangular pitch so as to open on an inner circumference side thereof; and a stator coil formed by AC connection of four-turn phase coils constructed by serially inserting coil conductors into the slots separated by a predetermined interval of the slots, the coil conductors being arranged four in a line in a radial direction, and wherein each of the phase coils comprises:

one of nearly U-shaped first coil pieces, which constitute the coil conductors, inserted from an axial side into one set of two of the separated slots so that the first coil piece is respectively positioned at a first outermost place in one slot of the one set and at a third outermost place in the other slot of the one set, and remaining first coil pieces inserted from an axial side into remaining sets of two of the separated slots, respectively, so that one of the remaining first coil pieces is respectively positioned at a first outermost place in one slot of each of the remaining sets and at a fourth outermost place in the other slot of each of the remaining sets and that another of the remaining first coil pieces is respectively positioned at a second outermost place in the one slot of each of the remaining sets and at a third outermost place in the other slot of each of the remaining sets; and second coil pieces, which constitute the coil conductors, inserted into the one set of two of the separated slots so that the second coil pieces are respectively positioned at a second outermost place in the one slot of the one set and at a fourth outermost place of the other slot of the one set and that end portions of the second coil piece extend from each slot of the one set to both axial sides, wherein one of the remaining first coil pieces, which are respectively inserted from the axial side into the first outermost place in one slot of each of the remaining sets and the fourth outermost place in the other slot of each of the remaining sets, is respectively placed in each gap formed between another of the remaining first coil pieces, which are respectively inserted from the axial side into the second outermost place in the one slot of each of the remaining sets and the third outermost place in the other slot of each of the remaining sets, at the connecting portion thereof by setting heights of apex portion of the connecting portion at an equal value, wherein a four-turn coil is formed by connecting an end portion of each of the first and second coil pieces, which extend from the second outermost place in each of the slots to an axial opposite side and are bent circumferentially outwardly, to a corresponding end portion of the first coil pieces, which extend from the first outermost place of the slot, whose slot number differs from that thereof by the predetermined interval of the slots, to the axial opposite side and are bent circumferentially inwardly and by connecting an end portion of each of the first and second coil pieces, which extend from the fourth outermost place in the slots to the axial opposite side and are bent circumferentially inwardly, is connected to a corresponding end portion of the first coil pieces, which extends from the third outermost place in the slot, whose slot number differs from that thereof by the predetermined interval of the slots, to the axial opposite side and is bent circumferentially outwardly, and wherein an end portion of the second coil piece extending from the second outermost place in the one slot of the one set to the axial side and an end portion of the second coil piece extending from the fourth outermost place in the other slot of the one set to the axial side are used as a lead wire and a wire connected to a neutral point formed among the phase coils.

Thus, the connecting portion of the first coil pieces, which are positioned at the first outermost place in one slot of one set of two of the separated slots and at the third outermost place in the other slot of the one set, is substituted for the crossover connection portions of the phase coils. Consequently, there is no axial projection in the aligned coil end portions. Thus, the wind resistance at the discharge side of the fan is decreased. The cooling ability of the generator is improved. Moreover, the higher-order discomfort interference noises generated between the coil end portion and the rotor or the coil end portion and the fan are reduced. Furthermore, the work of connecting the crossover connection portion, namely, the work of cutting, bending and drawing the coil pieces is omitted. Thus, the assemblability of the stator is enhanced. Furthermore, power generation failure due to a break in the crossover connection portions formed by connecting end portions is prevented. Furthermore, the connecting portions of the first coil pieces constituting the coil end portion are arranged in the circumferential direction by setting heights of apex portion of the connecting portion at an equal value, enabling cooling ability of the AC generator to be enhanced.

Further, according to an embodiment of the present invention, the second coil pieces are constructed by which a nearly U-shaped coil piece is inserted from the axial side into the one set of two of the separated slots so that the U-shaped coil piece is respectively positioned at a second outermost place in one slot of the one set and at a fourth outermost place in the other slot of the one set, and the U-shaped coil piece is cut off at a connecting portion thereof after inserted into the slots. Thus, the process of producing the stator coil is simplified. Consequently, the workability is enhanced.

Additionally, according to another aspect of the present invention, there is provided another a vehicular AC generator which comprises:

a shaft rotatably supported on a pair of brackets;

a rotor fixed to the shaft and disposed in the pair of brackets;

a stator disposed at an outer-circumference-side of the rotor and fixed to the pair of brackets;

internal fittings placed at a rear side of the rotor; and a fan driven by a rotation of the shaft and for forming a flow of cooling air flowing along an axis of the shaft, wherein the stator comprises:

a stator core in which a plurality of slots, whose grooves extend in an axial direction, are circumferentially provided at an equiangular pitch so as to open on an inner circumference side thereof; and a stator coil formed by AC connection of four-turn phase coils constructed by serially inserting coil conductors into the slots separated by a predetermined interval of the slots, the coil conductors being arranged four in a line in a radial direction, and wherein each of the phase coils comprises:

one of nearly U-shaped first coil pieces, which constitute the coil conductors, inserted from an axial side into one set of two of the separated slots so that the first coil piece is respectively positioned at a first outermost place in one slot of the one set and at a fourth outermost place in the other slot of the one set, and remaining first coil pieces inserted from an axial side into remaining sets of two of the separated slots, respectively, so that one of the remaining first coil pieces is respectively positioned at a first outermost place in one slot of each of the remaining sets and at a third outermost place in the other slot of each of the remaining sets and that another of the remaining first coil pieces is respectively positioned at a second outermost place in the one slot of each of the remaining sets and at a fourth outermost place in the other slot of each of the remaining sets; and second coil pieces, which constitute the coil conductors, inserted into the one set of two of the separated slots so that the second coil pieces are respectively positioned at a second outermost place in the one slot of the one set and at a third outermost place of the other slot of the one set and that end portions of the second coil piece extend from each slot of the one set to both axial sides, wherein a four-turn coil is formed by connecting an end portion of each of the first and second coil pieces, which extend from the second outermost place in each of the slots to an axial opposite side and are bent circumferentially outwardly, to a corresponding end portion of the first coil pieces, which extend from the first outermost place of the slot, whose slot number differs from that thereof by the predetermined interval of the slots, to the axial opposite side and are bent circumferentially inwardly and by connecting an end portion of each of the first coil pieces, which extend from the fourth outermost place in the slots to the axial opposite side and are bent circumferentially outwardly, to a corresponding end portion of the first and second coil pieces, which extends from the third outermost place in the slot, whose slot number differs from that thereof by the predetermined interval of the slots, to the axial opposite side and is bent circumferentially inwardly;

and wherein end portions of the second coil piece extending from the second outermost place in the one slot of the one set to the axial side and from the third outermost place in the other slot of the one set to the axial side are used as a lead wire and a wire connected to a neutral point formed among the phase coils.

Thus, the connecting portion of the first coil pieces, which are positioned at the first outermost place in one slot of one set of two of the separated slots and at the fourth outermost place in the other slot of the one set, is substituted for the crossover connection portions of the phase coils. Consequently, the aligned coil end portion has no axial projections formed on the crossover connection portion. Therefore, the wind resistance at the discharge side of the fan is reduced. Moreover, the cooling ability of the generator is enhanced. Furthermore, the higher-order discomfort interference noises generated between the coil end portion and the rotor or the coil end portion and the fan are reduced. The wind noises are decreased. Additionally, the work of connecting the crossover connection portion, that is, the work of cutting, bending and drawing the coil pieces is omitted. Consequently, the assemblability of the stator is enhanced. Furthermore, the crossover connection portions formed by connecting end portions of coil pieces are omitted. Consequently, an occurrence of power generation failure owing to a break in the crossover connection portion, which is caused y vibrations, is prevented.

Further, according to an embodiment of the present invention, the second coil pieces are constructed by which a nearly U-shaped coil piece is inserted from the axial side into the one set of two of the separated slots so that the U-shaped coil piece is respectively positioned at a second outermost place in one slot of the one set and at a third outermost place in the other slot of the one set, and the U-shaped coil piece is cut off at a connecting portion thereof after inserted into the slots. Thus, two leg portions of one coil piece are respectively inserted from an axial side into a set of slots, whose slot numbers differ from each other by a predetermined number, and then the inserted coil piece is cut off at the connecting portion thereof. Consequently, the process of producing the stator coil is simplified. The workability is enhanced.

Moreover, according to an embodiment of the present invention, a coil end portion constituted by a connecting portion of the first coil piece is placed at a rear side. Thus, the height of the rear-side coil end portion is reduced. Consequently, the internal devices, such as the rectifier and the regulator, to be cooled are effectively cooled.

Moreover, according to an embodiment of the present invention, an axial height of a rear-side coil end portion in a axial direction is lower than that of a front-side coil end portion and an axial lap amount between the front-side coil end portion and the fan is larger than that between the rear-side coil end portion and the fan. Thus, since there is no internal fittings in the front-side cooling path, the front-side coil end portion is efficiently cooled by the front-side cooling air suppressed temperature increases, enabling temperature increases in the stator coil to be suppressed.

Moreover, according to an embodiment of the present invention, gaps between the apex portion of the rear-side coil end portion and the internal fittings and between the apex portion of the rear-side coil end portion and an apex-facing surface of the bracket facing to the apex of the rear-side coil end portion are uniformly formed in a circumferential direction. Thus, it is possible to suppress fluctuations in the wind resistance of the cooling air path in the circumferential direction. Consequently, overall wind resistance of the cooling air path is reduced, enabling temperature increases in the internal fittings to be suppressed.

Moreover, according to an embodiment of the present invention, the apex portions of the connecting portions of the first coil pieces are exposed in an axial direction. Thus, the open-end portions of the first and second coil pieces are of the same uniform height by chucking the stator core and holding the connecting portions thereof in the jointing process before the open-end portions are jointed. Consequently, the open-end portions are jointed in a stable condition and the workability in jointing between the open-end portions is enhanced.

Moreover, according to an embodiment of the present invention, the fan is fixed to a rear-side axial end of the rotor. Thus, the rear-side cooling air path in which the cooling air flows is formed, enabling temperature increases in the internal fittings to be suppressed.

Moreover, according to an embodiment of the present invention, the fans are fixed to both axial end of the rotor. Thus, the rear-side and front-side cooling air path in which the cooling air flows are formed, enabling cooling ability in the AC generator to be enhanced.

Moreover, according to an embodiment of the present invention, front-side exhaust wind volume is larger than rear-side exhaust wind volume. Thus, it is possible to cool the front-side coil end portion efficiently, enabling temperature increases to suppressed. Further, the front-side exhaust wind volume having a low wind resistance increases compared with the rear-side exhaust wind volume having a high wind resistance, preventing wind noise from being deteriorated.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A vehicular AC generator comprising:
  a shaft rotatably supported on a pair of brackets;
  a rotor fixed to said shaft and disposed in said pair of brackets;
  a stator disposed at an outer-circumference-side of said rotor and fixed to said pair of brackets;
  internal fittings placed at a rear side of said rotor; and
  a fan driven by a rotation of said shaft and for forming a flow of cooling air flowing along an axis of said shaft,
  wherein said stator comprises:
    a stator core in which a plurality of slots, whose grooves extend in an axial direction, are circumferentially provided at an equiangular pitch so as to open on an inner circumference side thereof; and
    a stator coil formed by AC connection of four-turn phase coils constructed by serially inserting coil conductors into said slots separated by a predetermined interval of said slots, said coil conductors being arranged four in a line in a radial direction,
  and wherein each of said phase coils comprises:
    one of nearly U-shaped first coil pieces, which constitute said coil conductors, inserted from an axial side into one set of two of said separated slots so that said first coil piece is respectively positioned at a first outermost place in one slot of said one set and at a third outermost place in the other slot of said one set, and remaining first coil pieces inserted from an axial side into remaining sets of two of said separated slots, respectively, so that one of said remaining first coil pieces is respectively positioned at a first outermost place in one slot of each of said remaining sets and at a fourth outermost place in the other slot of each of said remaining sets and that another of said remaining first coil pieces is respectively positioned at a second outermost place in said one slot of each of said remaining sets and at a third outermost place in the other slot of each of said remaining sets; and second coil pieces, which constitute said coil conductors, inserted into said one set of two of said separated slots so that said second coil pieces are respectively positioned at a second outermost place in said one slot of said one set and at a fourth outermost place of the other slot of said one set and that end portions of said second coil piece extend from each slot of said one set to both axial sides, wherein one of said remaining first coil pieces, which are respectively inserted from the axial side into the first outermost place in one slot of each of said remaining sets and the fourth outermost place in the other slot of each of said remaining sets, is respectively placed in each gap formed between another of said remaining first coil pieces, which are respectively inserted from the axial side into the second outermost place in said one slot of each of said remaining sets and the third outermost place in the other slot of each of said remaining sets, at said connecting portion thereof by setting heights of apex portion of said connecting portion at an equal value, wherein a four-turn coil is formed by connecting an end portion of each of said first and second coil pieces, which extend from the second outermost place in each of said slots to an axial opposite side and are bent circumferentially outwardly, to a corresponding end portion of said first coil pieces, which extend from the first outermost place of said slot, whose slot number differs from that thereof by the predetermined interval of said slots, to the axial opposite side and are bent circumferentially inwardly and by connecting an end portion of each of said first and second coil pieces, which extend from the fourth outermost place in said slots to the axial opposite side and are bent circumferentially inwardly, is connected to a corresponding end portion of said first coil pieces, which extends from the third outermost place in said slot, whose slot number differs from that thereof by the predetermined interval of said slots, to the axial opposite side and is bent circumferentially outwardly, and wherein an end portion of said second coil piece extending from the second outermost place in said one slot of said one set to the axial side and an end portion of said second coil piece extending from the fourth outermost place in the other slot of said one set to the axial side are used as a lead wire and a wire connected to a neutral point formed among said phase coils.

2. The vehicular AC generator according to claim 1, wherein said second coil pieces are constructed by which a nearly U-shaped coil piece is inserted from the axial side into said one set of two of said separated slots so that said U-shaped coil piece is respectively positioned at a second outermost place in one slot of said one set and at a fourth outermost place in the other slot of said one set, and said U-shaped coil piece is cut off at a connecting portion thereof after inserted into said slots.

3. The vehicular AC generator according to claim 1, wherein a coil end portion constituted by said connecting portions of said first coil piece is placed at a rear side.

4. The vehicular AC generator according to claim 3, wherein an axial height of a rear-side coil end portion in a axial direction is lower than that of a front-side coil end portion and an axial lap amount between said front-side coil end portion and said fan is larger than that between said rear-side coil end portion and said fan.

* * * * *